(12) United States Patent
Agrawal et al.

(10) Patent No.: US 12,221,373 B2
(45) Date of Patent: Feb. 11, 2025

(54) METHODS AND APPARATUS FOR PRODUCING A GLASS RIBBON

(71) Applicant: Corning Incorporated, Corning, NY (US)

(72) Inventors: Anmol Agrawal, Horseheads, NY (US); Douglas Dale Bressler, Julian, PA (US); Matthew John Cempa, Tyrone, PA (US); Frank Coppola, Horseheads, NY (US); Anurag Jain, Painted Post, NY (US); Francisco Javier Moraga, Corning, NY (US); Shyam Prasad Mudiraj, Painted Post, NY (US); Ibraheem Rasool Muhammad, Clayton, NJ (US); Rui Zhang, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 474 days.

(21) Appl. No.: 17/621,273

(22) PCT Filed: Jun. 26, 2020

(86) PCT No.: PCT/US2020/039751
§ 371 (c)(1),
(2) Date: Dec. 21, 2021

(87) PCT Pub. No.: WO2020/264252
PCT Pub. Date: Dec. 30, 2020

(65) Prior Publication Data
US 2022/0411309 A1    Dec. 29, 2022

Related U.S. Application Data

(60) Provisional application No. 62/896,699, filed on Sep. 6, 2019, provisional application No. 62/868,187, filed on Jun. 28, 2019.

(51) Int. Cl.
*C03B 17/06* (2006.01)

(52) U.S. Cl.
CPC ................................ *C03B 17/067* (2013.01)

(58) Field of Classification Search
CPC ..... C03B 17/067; C03B 17/064; C03B 18/04; C03B 25/08
See application file for complete search history.

(56) References Cited

U.S. PATENT DOCUMENTS 3,682,609 A * 8/1972 Dockerty .............. C03B 17/067
65/327
3,723,082 A * 3/1973 Knowles ............... C03B 17/064
65/195

(Continued)

FOREIGN PATENT DOCUMENTS

| CN | 102311218 A | 1/2012 |
|---|---|---|
| CN | 102803520 A | 11/2012 |

(Continued)

OTHER PUBLICATIONS

Chinese Patent Application No. 202080061279.8, Office Action dated Nov. 30, 2023, 4 pages (English Translation only), Chinese Patent Office.

(Continued)

*Primary Examiner* — Alison L Hindenlang
*Assistant Examiner* — Steven S Lee
(74) *Attorney, Agent, or Firm* — Kevin M. Able

(57) ABSTRACT

A glass manufacturing apparatus includes a forming apparatus defining a travel path extending in a travel direction. The forming apparatus conveys a ribbon of glass-forming material along the travel path in the travel direction of the forming apparatus. The glass manufacturing apparatus includes a cooling tube extending substantially parallel to the travel path and extending across the travel direction. The (Continued)

cooling tube includes a plurality of orifices spaced apart along the cooling tube and facing the travel path. Methods of manufacturing glass can comprise flowing a coolant from an outlet of a conduit in a direction toward a target location of a flowing ribbon of molten material. Methods can also include changing a phase of the coolant while the coolant is flowing towards the target location. The change in phase can cool the target location.

8 Claims, 13 Drawing Sheets

(56) References Cited

U.S. PATENT DOCUMENTS

| | | | |
|---|---|---|---|
| 5,647,882 A * | 7/1997 | Thiessen | C03B 27/0404 |
| | | | 34/635 |
| 5,707,412 A | 1/1998 | Franz et al. | |
| 5,772,717 A * | 6/1998 | Kirschner | B32B 17/1099 |
| | | | 65/118 |
| 5,931,981 A | 8/1999 | McMaster et al. | |
| 5,968,220 A * | 10/1999 | McMaster | C03B 27/026 |
| | | | 65/114 |
| 8,393,178 B2 | 3/2013 | Aniolek et al. | |
| 8,978,417 B2 | 3/2015 | Abramov et al. | |
| 9,598,301 B2 | 3/2017 | Fournel | |
| 9,758,418 B1 | 9/2017 | El-Kahlout et al. | |
| 9,790,119 B2 | 10/2017 | Aniolek et al. | |
| 9,919,944 B2 | 3/2018 | Geathers et al. | |
| 9,938,177 B2 | 4/2018 | Welles | |
| 2008/0131651 A1 * | 6/2008 | Burdette | C03B 17/065 |
| | | | 65/193 |
| 2010/0218557 A1 * | 9/2010 | Aniolek | C03B 17/067 |
| | | | 65/97 |
| 2011/0094267 A1 * | 4/2011 | Aniolek | C03B 17/065 |
| | | | 65/91 |
| 2011/0289969 A1 * | 12/2011 | Delia | C03B 17/067 |
| | | | 65/195 |
| 2012/0060536 A1 | 3/2012 | Ahonen et al. | |
| 2012/0247154 A1 | 10/2012 | Abramov et al. | |
| 2013/0133369 A1 * | 5/2013 | Lock | C03B 17/065 |
| | | | 65/93 |
| 2016/0107916 A1 * | 4/2016 | Welles | C03B 17/064 |
| | | | 65/195 |

FOREIGN PATENT DOCUMENTS

| | | | | |
|---|---|---|---|---|
| CN | 103608307 A | | 2/2014 | |
| CN | 105307988 A | | 2/2016 | |
| CN | 109574472 A | * | 4/2019 | ........... C03B 17/064 |
| JP | 2018104244 A | * | 7/2018 | |
| WO | WO-2011149800 A2 | * | 12/2011 | ........... C03B 17/064 |
| WO | 2012/174353 A2 | | 12/2012 | |
| WO | 2014/134108 A1 | | 9/2014 | |
| WO | 2014/193780 A1 | | 12/2014 | |
| WO | WO-2018232159 A2 | * | 12/2018 | |
| WO | WO-2019089525 A1 | * | 5/2019 | ............ C03B 13/04 |
| WO | WO-2020031811 A1 | * | 2/2020 | |

OTHER PUBLICATIONS

Lee et al., "Cooling of Heated Surface by Mist Flow", Journal of Heat Transfer, vol. 116, Issue 1, 1994, pp. 167-172.
International Search Report and Written Opinion of the International Searching Authority; PCT /US2020/0397 51; dated Oct. 21, 2020; pp. 11; Korean Patent Office.

* cited by examiner

METHODS AND APPARATUS FOR PRODUCING A GLASS RIBBON

CROSS-REFERENCE TO RELATED APPLICATIONS

This application is a national stage application under 35 U.S.C. § 371 of International Application No. PCT/US2020/039751, filed on Jun. 26, 2020, which claims the benefit of priority of U.S. Provisional Application Ser. No. 62/868,187 filed on Jun. 28, 2019, and further claims the benefit of priority of U.S. Provisional Application Ser. No. 62/896,699 filed on Sep. 6, 2019, the contents of which are relied upon and incorporated herein by reference in their entirety.

FIELD

The present disclosure relates generally to apparatus and methods for producing a glass ribbon and, more particularly, to apparatus and methods for cooling a glass ribbon.

BACKGROUND

It is known to manufacture molten material into a glass ribbon with a glass manufacturing apparatus. To increase the production capability of the glass manufacturing apparatus, a flow rate of the molten material can be increased. However, increasing the flow rate may necessitate an increase in cooling of the molten material to maintain a target cooling curve.

SUMMARY

The following presents a simplified summary of the disclosure to provide a basic understanding of some embodiments described in the detailed description.

Methods of manufacturing glass in accordance with embodiments of the disclosure can aid in increasing a flow rate of molten material in a glass manufacturing process and can inhibit (e.g., reduce, prevent, eliminate) problems associated with baggy warp. Baggy warp can occur when the viscosity of the molten material drawn from the forming device is too low such that a drawn ribbon of molten material cannot maintain its thickness, registration, and/or shape either under gravity, the force of pull rollers, or both. Embodiments of the disclosure can avoid baggy warp by aggressively cooling an outer portion of the streams of molten material (e.g., first stream, second stream) opposite the inner portion of the respective stream of molten material to increase an effective viscosity where the ribbon of molten material is drawn. Methods of the embodiments of the disclosure can address baggy warp by allowing greater cooling rates (e.g., heat flux) and/or cooling capacity than would be possible using heat transfer, for example, by convection and/or radiation. Aggressive cooling of the glass ribbon can also facilitate processing of molten material with a low liquidus viscosity to a predetermined thickness. Further, directing the coolant toward a location on the ribbon of molten material positioned below the forming vessel can inhibit the crystallization of the molten material on the forming vessel. Additionally, directing the coolant toward a location above pull rollers can increase processing efficiency. Increased cooling capacity (e.g., above the pull rollers, below the forming device) can enable a reduction in a length of molten material travel path from when the ribbon of molten material is drawn from the forming vessel and when it can be handled.

Accordingly, a glass manufacturing apparatus is disclosed comprising a forming apparatus defining a travel path extending in a travel direction. The forming apparatus is configured to convey a ribbon of glass-forming material along the travel path in the travel direction of the forming apparatus. The glass manufacturing apparatus comprises a cooling tube extending substantially parallel to the travel path and extending across the travel direction. The cooling tube comprises a plurality of orifices spaced apart along the cooling tube and facing the travel path.

In some embodiments, the cooling tube extends linearly along a cooling axis.

In some embodiments, the cooling axis is substantially perpendicular to the travel direction.

In some embodiments, the glass manufacturing apparatus comprises a plurality of nozzles, wherein each nozzle of the plurality of nozzles is in fluid communication with a corresponding one or more orifices of the plurality of orifices, and each nozzle of the plurality of nozzles is configured to discharge atomized streams of fluid toward the travel path.

In some embodiments, a first nozzle orifice of a first nozzle of the plurality of nozzles comprises a first diameter and a second nozzle orifice of a second nozzle of the plurality of nozzles comprises a second diameter equal to the first diameter.

In some embodiments, the plurality of nozzles comprises a set of sequentially spaced nozzles comprising the first nozzle, the second nozzle spaced a first distance from the first nozzle, and a third nozzle of the plurality of nozzles spaced a second distance from the second nozzle, wherein the second nozzle is positioned in series between the first nozzle and the third nozzle, and the first distance is different than the second distance.

In some embodiments, a third nozzle orifice of the third nozzle comprises a third diameter that is different than the second diameter.

In some embodiments, the cooling tube comprises a plurality of cooling tubes, wherein a first set of the plurality of cooling tubes is positioned on a first side of the travel path, and a second set of the plurality of cooling tubes is positioned on a second side of the travel path.

In some embodiments, cooling tubes of the first set of the plurality of cooling tubes are sequentially spaced apart along the travel direction and cooling tubes of the second set of the plurality of cooling tubes are sequentially spaced apart along the travel direction.

In accordance with some embodiments, a glass manufacturing apparatus is described comprising a forming apparatus defining a travel path extending in a travel direction. The forming apparatus is configured to convey a ribbon of glass-forming material along the travel path in the travel direction of the forming apparatus. The glass manufacturing apparatus comprises a nozzle configured to discharge an atomized stream of fluid toward the travel path.

In some embodiments, the nozzle is configured to discharge one or more droplets of the atomized stream of fluid, the one or more droplets comprising a diameter within a range from about 0.5 micrometers to about 3 micrometers.

In some embodiments, the nozzle is configured to discharge the atomized stream of fluid within a spray angle range from about 0 degrees to about 90 degrees.

In some embodiments, the glass manufacturing apparatus comprises a cooling tube extending substantially parallel to the travel path and extending across the travel direction, the cooling tube comprising a plurality of orifices facing the travel path.

In some embodiments, a first cooling tube extends substantially parallel to the travel path and extends across the travel direction. The first cooling tube comprises a first orifice facing the travel path.

In some embodiments, the nozzle comprises a plurality of nozzles sequentially spaced across the travel direction.

In accordance with some embodiments, methods of producing a glass ribbon are disclosed comprising forming a ribbon of glass-forming material. Methods can comprise moving the ribbon of glass-forming material along a travel path in a travel direction. Methods can comprise converting a cooling fluid into one or more atomized streams of fluid. Methods can comprise converting a cooling fluid into one or more atomized streams of fluid. Methods can comprise directing the one or more atomized streams of fluid toward an area of the ribbon of glass-forming material. Methods can comprise cooling the area of the ribbon of glass-forming material by evaporating a portion of the one or more atomized streams of fluid without contacting the portion of the one or more atomized streams of fluid with the area of the ribbon of glass-forming material. Methods can comprise cooling the ribbon of glass-forming material into the glass ribbon.

In some embodiments, the directing the one or more atomized streams of fluid can comprise directing a first atomized stream of fluid toward a first side of the ribbon of glass-forming material and directing a second atomized stream of fluid toward a second side of the ribbon of glass-forming material.

In some embodiments, the directing the one or more atomized streams of fluid can comprise directing a third atomized stream of fluid toward the first side of the ribbon of glass-forming material downstream from the first atomized stream of fluid relative to the travel direction.

In some embodiments, the directing the one or more atomized streams of fluid toward the area of the ribbon of glass-forming material can comprise varying an amount of the one or more atomized streams of fluid directed toward the area.

In some embodiments, the cooling the area of the ribbon of glass-forming material can comprise attaining a substantially uniform temperature of the ribbon of glass-forming material along an axis perpendicular to the travel direction.

In still other embodiments, a method of manufacturing glass is disclosed, comprising flowing a coolant from an outlet of a conduit in a direction toward a target location of a flowing ribbon of molten material and changing a phase of the coolant while the coolant is flowing toward the target location, the change in phase cooling the target location. The coolant can comprise one or more of water, nitrogen, or carbon dioxide.

In some embodiments, a mass flow rate of the coolant flowing from the outlet can be in a range from about 1 gram per minute to about 200 grams per minute.

In some embodiments, the coolant flowing from the outlet can comprise solid particles with a median particle size in a range from about 5 micrometers to about 20 micrometers. For example, about 90% of the solid particles can comprise a size in a range from about 1 micrometer to about 100 micrometers.

In some embodiments, the coolant flowing from the outlet can comprise liquid droplets.

The method may further comprise heating the conduit. The method may further comprise moving the gas with a convective air current traveling along the ribbon of molten material. The convective air current can flow in a direction opposite a travel direction of the ribbon of molten material.

In some embodiments, the target location can be positioned below a forming vessel. For example, a minimum distance between the forming vessel and the target location can be about 1 meter or less.

The method may comprise pulling the molten material with pull rollers, wherein the target location is positioned between the forming vessel and the pull rollers.

A minimum distance between the outlet and the flowing ribbon of molten material can be in a range from about 100 millimeters to about 1 meter.

The conduit can comprise a nozzle comprising the outlet. For example, the nozzle can comprise a boiling nozzle or a shear nozzle. In some embodiments, the nozzle can comprise a diffuser.

In some embodiments, the conduit can comprise a plurality of conduits, the outlets of a first set of the plurality of conduits flowing the coolant toward a first surface of the ribbon of molten material, and the outlets of a second set of the plurality of conduits flowing the coolant toward a second surface of the ribbon of molten material opposite the first surface. The first set of the plurality of conduits can be arranged in a first row. The second set of the plurality of conduits can be arranged in a second row.

In some embodiments, the method may further comprise determining a deviation of a thickness of a portion of the ribbon of molten material from a predefined thickness, the cooling reducing the deviation of the thickness of the portion of the ribbon of molten material from the predefined thickness by increasing a viscosity of the portion of the ribbon of molten material.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings. It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
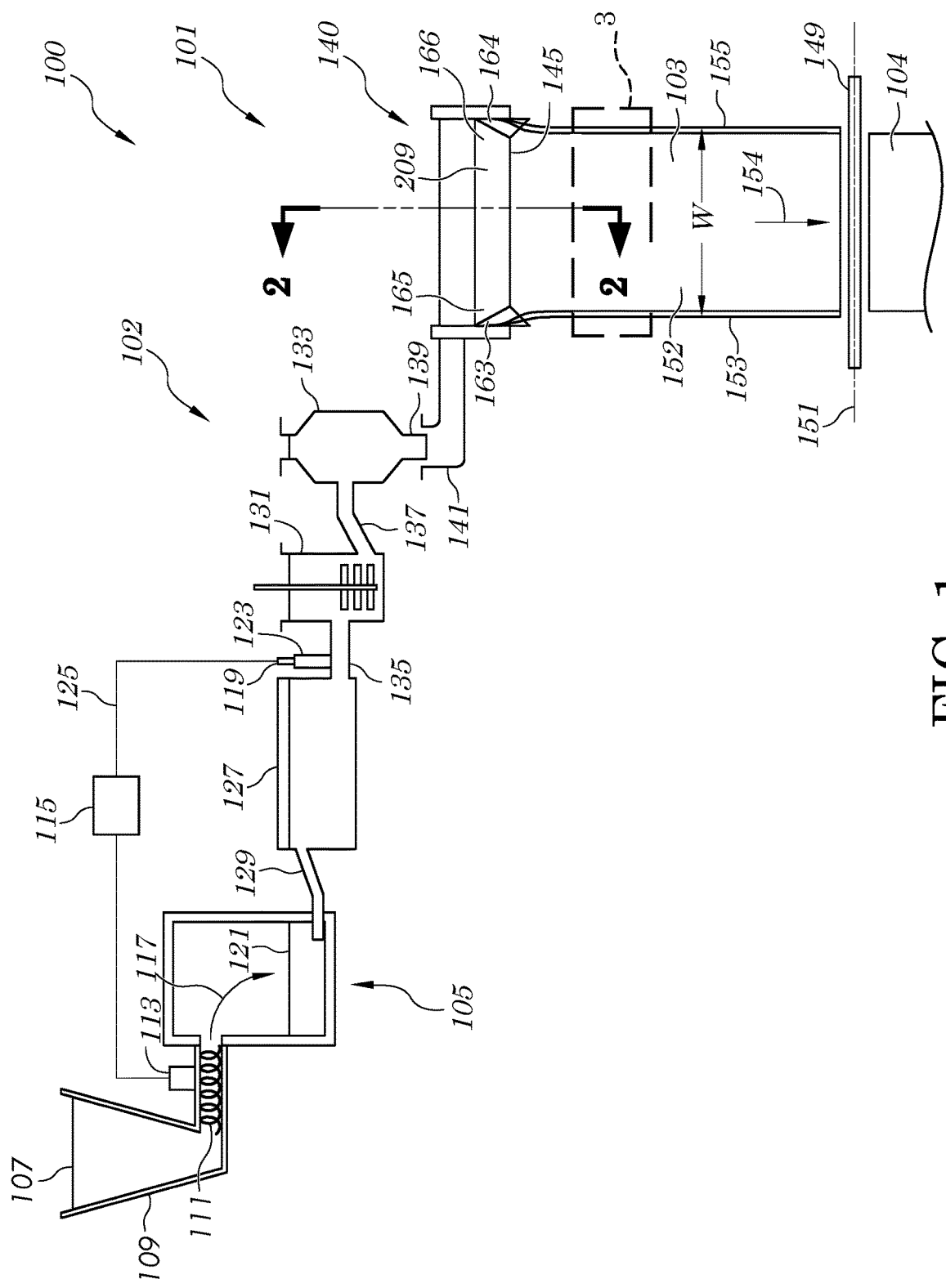
FIG. 1 schematically illustrates example embodiments of a glass manufacturing apparatus in accordance with embodiments of the disclosure.

Embodiments will now be described more fully hereinafter with reference to the accompanying drawings in which example embodiments are shown. Whenever possible, the same reference numerals are used throughout the drawings to refer to the same or like parts. However, this disclosure may be embodied in many different forms and should not be construed as limited to the embodiments set forth herein.

The present disclosure relates to a glass manufacturing apparatus and methods for producing a glass ribbon. Methods and apparatus for producing a glass ribbon will now be described by way of example embodiments for producing a glass ribbon from a ribbon of glass-forming material. As schematically illustrated in FIG. 1, in some embodiments, an exemplary glass manufacturing apparatus 100 can comprise a glass melting and delivery apparatus 102 and a forming apparatus 101 comprising a forming vessel 140 designed to produce a ribbon of glass-forming material 103 from a quantity of molten material 121. In some embodiments, the ribbon of glass-forming material 103 can comprise a central portion 152 positioned between opposite edge portions (e.g., edge beads) formed along a first outer edge 153 and a second outer edge 155 of the ribbon of glass-forming material 103, wherein a thickness of the edge portions can be greater than a thickness of the central portion. Additionally, in some embodiments, a separated glass ribbon 104 can be separated from the ribbon of glass-forming material 103 along a separation path 151 by a glass separator 149 (e.g., scribe, score wheel, diamond tip, laser, etc.).

In some embodiments, the glass melting and delivery apparatus 102 can comprise a melting vessel 105 oriented to receive batch material 107 from a storage bin 109. The batch material 107 can be introduced by a batch delivery device 111 powered by a motor 113. In some embodiments, an optional controller 115 can be operated to activate the motor 113 to introduce a desired amount of batch material 107 into the melting vessel 105, as indicated by arrow 117. The melting vessel 105 can heat the batch material 107 to provide molten material 121. In some embodiments, a melt probe 119 can be employed to measure a level of molten material 121 within a standpipe 123 and communicate the measured information to the controller 115 by way of a communication line 125.

Additionally, in some embodiments, the glass melting and delivery apparatus 102 can comprise a first conditioning station comprising a fining vessel 127 located downstream from the melting vessel 105 and coupled to the melting vessel 105 by way of a first connecting conduit 129. In some embodiments, molten material 121 can be gravity fed from the melting vessel 105 to the fining vessel 127 by way of the first connecting conduit 129. For example, in some embodiments, gravity can drive the molten material 121 through an interior pathway of the first connecting conduit 129 from the melting vessel 105 to the fining vessel 127. Additionally, in some embodiments, bubbles can be removed from the molten material 121 within the fining vessel 127 by various techniques.

In some embodiments, the glass melting and delivery apparatus 102 can further comprise a second conditioning station comprising a mixing chamber 131 that can be located downstream from the fining vessel 127. The mixing chamber 131 can be employed to provide a homogenous composition of molten material 121, thereby reducing or eliminating inhomogeneity that may otherwise exist within the molten material 121 exiting the fining vessel 127. As shown, the fining vessel 127 can be coupled to the mixing chamber 131 by way of a second connecting conduit 135. In some embodiments, molten material 121 can be gravity fed from the fining vessel 127 to the mixing chamber 131 by way of the second connecting conduit 135. For example, in some embodiments, gravity can drive the molten material 121 through an interior pathway of the second connecting conduit 135 from the fining vessel 127 to the mixing chamber 131.

Additionally, in some embodiments, the glass melting and delivery apparatus 102 can comprise a third conditioning station comprising a delivery chamber 133 that can be located downstream from the mixing chamber 131. In some embodiments, the delivery chamber 133 can condition the molten material 121 to be fed into an inlet conduit 141. For example, the delivery chamber 133 can function as an accumulator and/or flow controller to adjust and provide a consistent flow of molten material 121 to the inlet conduit 141. As shown, the mixing chamber 131 can be coupled to the delivery chamber 133 by way of a third connecting conduit 137. In some embodiments, molten material 121 can be gravity fed from the mixing chamber 131 to the delivery chamber 133 by way of the third connecting conduit 137. For example, in some embodiments, gravity can drive the molten material 121 through an interior pathway of the third connecting conduit 137 from the mixing chamber 131 to the delivery chamber 133. As further illustrated, in some embodiments, a delivery pipe 139 can be positioned to deliver molten material 121 to forming apparatus 101, for example the inlet conduit 141 of the forming vessel 140.

Forming apparatus 101 can comprise various embodiments of forming vessels in accordance with features of the disclosure, for example, a forming vessel with a wedge for fusion drawing the glass ribbon, a forming vessel with a slot to slot draw the glass ribbon, or a forming vessel provided with press rolls to press roll the glass ribbon from the forming vessel. In some embodiments, the forming apparatus 101 can comprise a sheet redraw, for example, with the forming apparatus 101 as part of a redraw process. For example, the glass ribbon 104, which can comprise a thickness, may be heated up and redrawn to achieve a thinner glass ribbon 104 comprising a smaller thickness. By way of illustration, the forming vessel 140 shown and disclosed below can be provided to fusion draw molten material 121 off a bottom edge, defined as a root 145, of a forming wedge 209 to produce the ribbon of glass-forming material 103. For example, in some embodiments, the molten material 121 can be delivered from the inlet conduit 141 to the forming vessel 140. The molten material 121 can then be formed into the ribbon of glass-forming material 103 based, in part, on the structure of the forming vessel 140. For example, as shown, the molten material 121 can be drawn off the bottom edge (e.g., root 145) of the forming vessel 140 along a draw path extending in a travel direction 154 of the glass manufacturing apparatus 100. In some embodiments, edge directors 163, 164 can direct the molten material 121 off the forming vessel 140 and define, in part, a width "W" of the ribbon of glass-forming material 103. In some embodiments, the width "W" of the ribbon of glass-forming material 103 extends between the first outer edge 153 of the ribbon of glass-forming material 103 and the second outer edge 155 of the ribbon of glass-forming material 103.

In some embodiments, the width "W" of the ribbon of glass-forming material 103, which extends between the first outer edge 153 of the ribbon of glass-forming material 103 and the second outer edge 155 of the ribbon of glass-forming material 103, can be greater than or equal to about 20 millimeters (mm), for example, greater than or equal to about 50 mm, for example, greater than or equal to about 100 mm, for example, greater than or equal to about 500 mm, for example, greater than or equal to about 1000 mm, for example, greater than or equal to about 2000 mm, for example, greater than or equal to about 3000 mm, for example, greater than or equal to about 4000 mm, although other widths less than or greater than the widths mentioned above can be provided in further embodiments. For example, in some embodiments, the width "W" of the ribbon of glass-forming material 103 can be within a range from about 20 mm to about 4000 mm, for example, within a range from about 50 mm to about 4000 mm, for example, within a range from about 100 mm to about 4000 mm, for example, within a range from about 500 mm to about 4000 mm, for example, within a range from about 1000 mm to about 4000 mm, for example, within a range from about 2000 mm to about 4000 mm, for example, within a range from about 3000 mm to about 4000 mm, for example, within a range from about 20 mm to about 3000 mm, for example, within a range from about 50 mm to about 3000 mm, for example, within a range from about 100 mm to about 3000 mm, for example, within a range from about 500 mm to about 3000 mm, for example, within a range from about 1000 mm to about 3000 mm, for example, within a range from about 2000 mm to about 3000 mm, for example, within a range from about 2000 mm to about 2500 mm, and all ranges and subranges therebetween.

Figure 2:
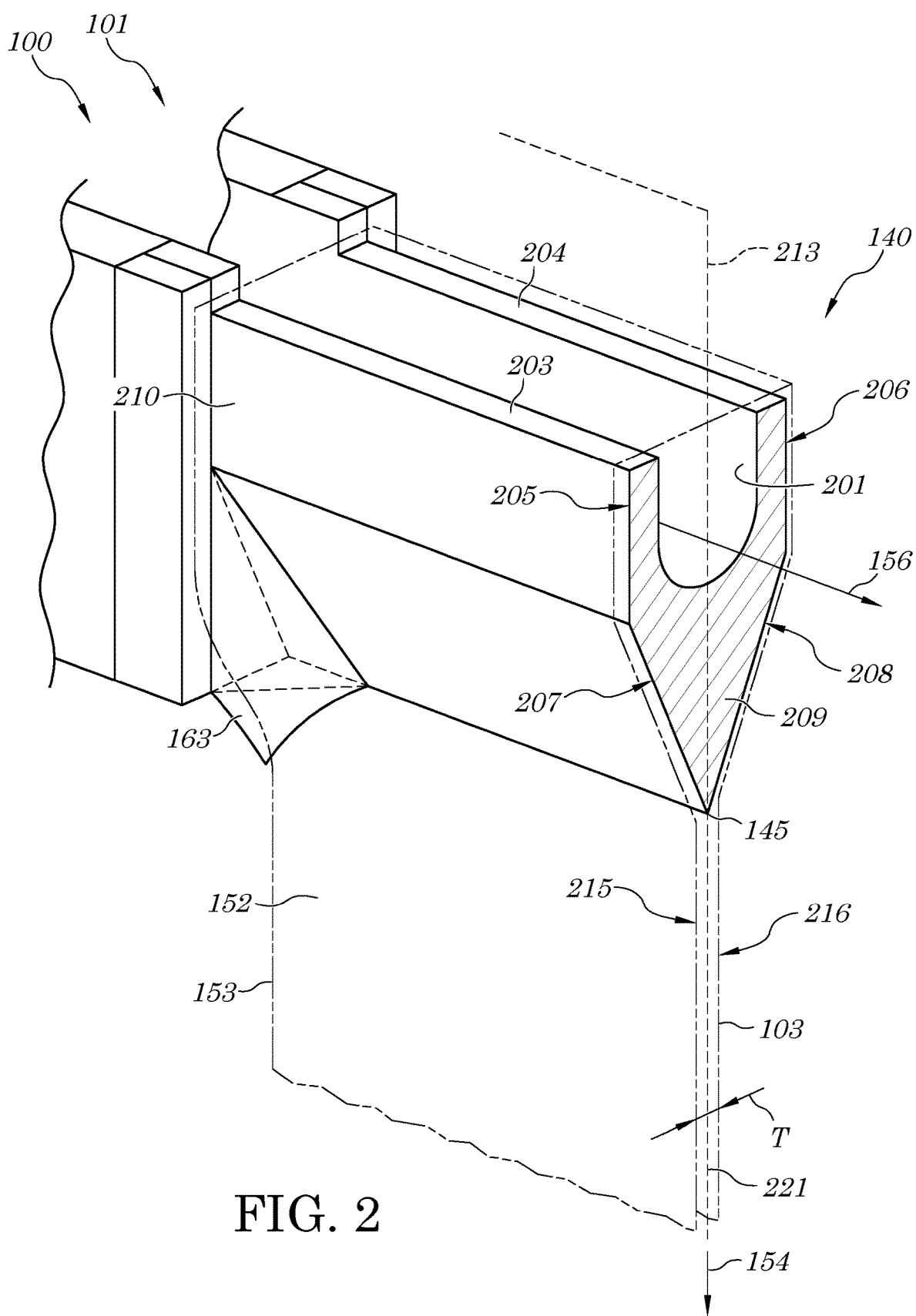
FIG. 2 illustrates a perspective cross-sectional view of the glass manufacturing apparatus along line 2-2 of FIG. 1 in accordance with embodiments of the disclosure.

FIG. 2 shows a cross-sectional perspective view of the forming apparatus 101 (e.g., forming vessel 140) along line 2-2 of FIG. 1. In some embodiments, the forming vessel 140 can comprise a trough 201 oriented to receive the molten material 121 from the inlet conduit 141. For illustrative purposes, cross-hatching of the molten material 121 is removed from FIG. 2 for clarity. The forming vessel 140 can further comprise the forming wedge 209 comprising a pair of downwardly inclined converging surface portions 207, 208 extending between opposed ends 165, 166 (See FIG. 1) of the forming wedge 209. The pair of downwardly inclined converging surface portions 207, 208 of the forming wedge 209 can converge along the travel direction 154 to intersect along the root 145 of the forming vessel 140. A draw plane 213 of the glass manufacturing apparatus 100 can extend through the root 145 along the travel direction 154. In some embodiments, the ribbon of glass-forming material 103 can be drawn in the travel direction 154 along the draw plane 213. As shown, the draw plane 213 can bisect the forming wedge 209 through the root 145 although, in some embodiments, the draw plane 213 can extend at other orientations relative to the root 145. In some embodiments, the ribbon of glass-forming material 103 can move along a travel path 221 that may be co-planar with the draw plane 213 in the travel direction 154.

Additionally, in some embodiments, the molten material 121 can flow in a direction 156 into and along the trough 201 of the forming vessel 140. The molten material 121 can then overflow from the trough 201 by simultaneously flowing over corresponding weirs 203, 204 and downward over the outer surfaces 205, 206 of the corresponding weirs 203, 204. Respective streams of molten material 121 can then flow along the downwardly inclined converging surface portions 207, 208 of the forming wedge 209 to be drawn off the root 145 of the forming vessel 140, where the flows converge and fuse into the ribbon of glass-forming material 103. The ribbon of glass-forming material 103 can then be drawn off the root 145 in the draw plane 213 along the travel direction 154. In some embodiments, the ribbon of glass-forming material 103 comprises one or more states of material based on a vertical location of the ribbon of glass-forming material 103. For example, at one location, the ribbon of glass-forming material 103 can comprise the viscous molten material 121, and at another location, the ribbon of glass-forming material 103 can comprise an amorphous solid in a glassy state (e.g., a glass ribbon).

The ribbon of glass-forming material 103 comprises a first major surface 215 and a second major surface 216 facing opposite directions and defining a thickness "T" (e.g., average thickness) of the ribbon of glass-forming material 103. In some embodiments, the thickness "T" of the ribbon of glass-forming material 103 can be less than or equal to about 2 millimeters (mm), less than or equal to about 1 millimeter, less than or equal to about 0.5 millimeters, for example, less than or equal to about 300 micrometers (μm), less than or equal to about 200 micrometers, or less than or equal to about 100 micrometers, although other thicknesses may be provided in further embodiments. For example, in some embodiments, the thickness "T" of the ribbon of glass-forming material 103 can be within a range from about 20 micrometers to about 200 micrometers, within a range from about 50 micrometers to about 750 micrometers, within a range from about 100 micrometers to about 700 micrometers, within a range from about 200 micrometers to about 600 micrometers, within a range from about 300 micrometers to about 500 micrometers, within a range from about 50 micrometers to about 500 micrometers, within a range from about 50 micrometers to about 700 micrometers, within a range from about 50 micrometers to about 600 micrometers, within a range from about 50 micrometers to about 500 micrometers, within a range from about 50 micrometers to about 400 micrometers, within a range from about 50 micrometers to about 300 micrometers, within a range from about 50 micrometers to about 200 micrometers, within a range from about 50 micrometers to about 100 micrometers, within a range from about 25 micrometers to about 125 micrometers, comprising all ranges and subranges of thicknesses therebetween. Exemplary molten materials, which may be free of lithia or not, can comprise soda lime molten material, aluminosilicate molten material, alkali-aluminosilicate molten material, borosilicate molten material, alkali-borosilicate molten material, alkali-alumniophosphosilicate molten material, or alkali-aluminoborosilicate glass molten material. In one or more embodiments, the molten material 121 may comprise, in mole percent (mol %): $SiO_2$ in a range from about 40 mol % to about 80%, $Al_2O_3$ in a range from about 10 mol % to about 30 mol %, $B_2O_3$ in a range from about 0 mol % to about 10 mol %, $ZrO_2$ in a range from about 0 mol % to about 5 mol %, $P_2O_5$ in a range from about 0 mol % to about 15 mol %, $TiO_2$ in a range from about 0 mol % to about 2 mol %, $R_2O$ in a range from about 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a molten material 121 may optionally further comprise in a range from about 0 mol % to about 2 mol %, any one or more of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. In some embodiments, the ribbon of glass-forming material 103, the glass ribbon 106, and/or glass sheets formed from the may be transparent, meaning that the ribbon of glass-forming material 103 and/or the glass ribbon 106 drawn from the molten material 121 can comprise an average light transmission over the optical wavelengths from 400 nanometers (nm) to 700 nm of about 85% or greater, about 86% or greater, about 87% or greater, about 88% or greater, about 89% or greater, about 90% or greater, about 91% or greater, or about 92% or greater.

In some embodiments, the glass separator 149 (see FIG. 1) can separate the glass ribbon 104 from the ribbon of glass-forming material 103 along the separation path 151 to provide a plurality of separated glass ribbons 104 (i.e., a plurality of sheets of glass). According to other embodiments, a longer portion of the glass ribbon 104 may be coiled onto a storage roll. The separated glass ribbon can then be processed into a desired application, e.g., a display application. For example, the separated glass ribbon can be used in a wide range of display applications, comprising liquid crystal displays (LCDs), electrophoretic displays (EPD), organic light emitting diode displays (OLEDs), plasma display panels (PDPs), touch sensors, photovoltaics, and other electronic displays.

Figure 3:
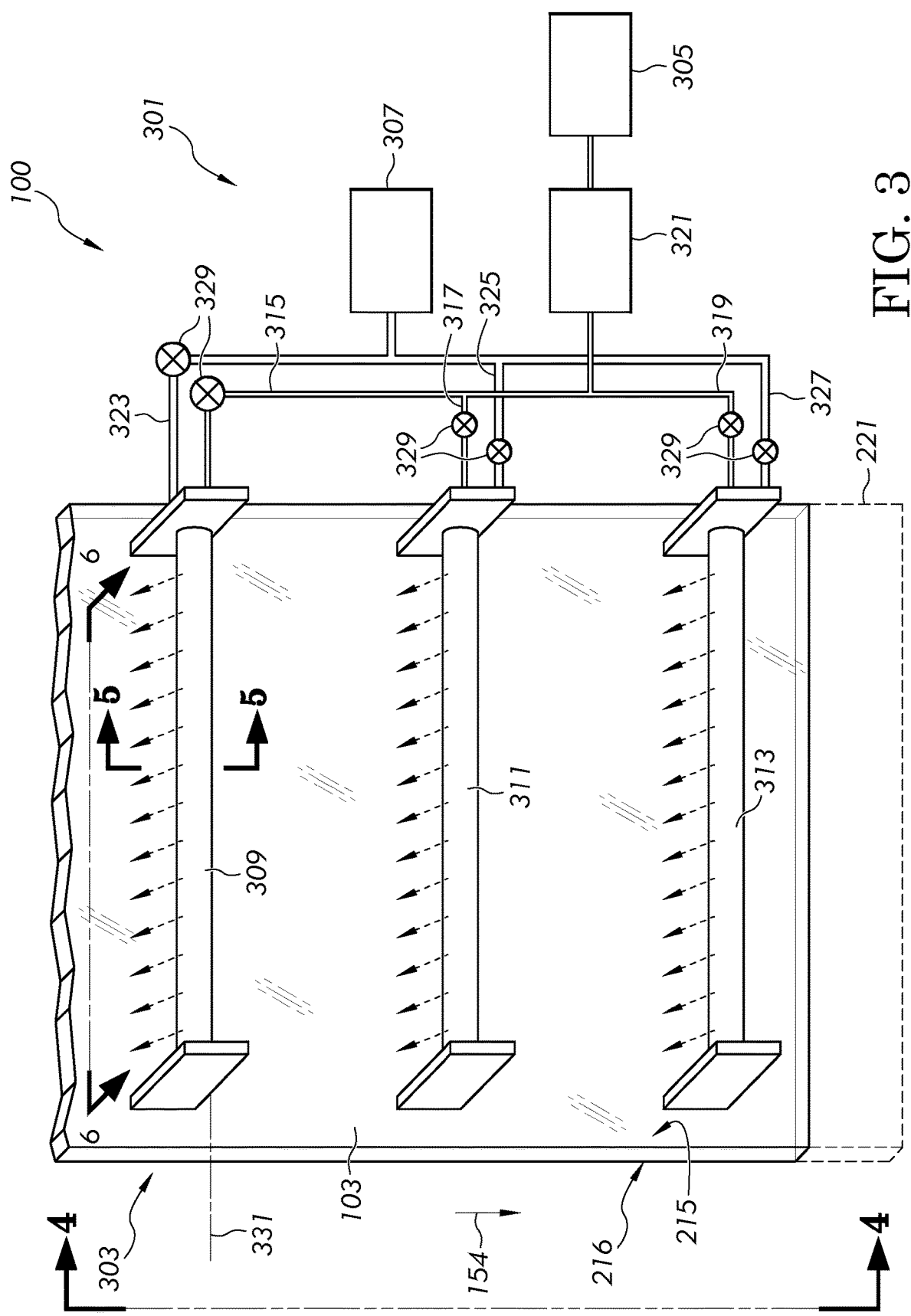
FIG. 3 illustrates an enlarged portion of the glass manufacturing apparatus taken at view 3 of FIG. 1 in accordance with embodiments of the disclosure.

FIG. 3 illustrates an enlarged view of a portion of the ribbon of glass-forming material 103 at view 3 of FIG. 1. In some embodiments, the glass manufacturing apparatus 100 can comprise a cooling apparatus 301 for cooling the ribbon of glass-forming material 103. For example, the ribbon of glass-forming material 103 can be conveyed from the forming apparatus 101 (e.g., illustrated in FIGS. 1-2) along the travel path 221 in the travel direction 154. The cooling apparatus 301 can be located downstream from the forming apparatus 101 (e.g., illustrated in FIG. 1) relative to the travel direction 154. For example, the cooling apparatus 301 can comprise a cooling tube extending substantially parallel to the travel path 221 and extending across the travel direction 154. In some embodiments, the cooling tube can comprise a plurality of cooling tubes 303.

The cooling apparatus 301 can comprise a fluid source 305 that can deliver a cooling fluid (e.g., water) to the plurality of cooling tubes 303. The cooling apparatus 301 can comprise a gas source 307 that can deliver a compressed gas (e.g., air) to the plurality of cooling tubes 303. The cooling fluid and the compressed gas can be mixed and discharged as an atomized stream of fluid from the plurality of cooling tubes 303 toward the ribbon of glass-forming material 103. In some embodiments, due to the relatively high temperatures adjacent to the ribbon of glass-forming material 103, the atomized stream of fluid can at least partially evaporate. For example, an air temperature adjacent to the ribbon of glass-forming material 103 can be within a range from about 315° Celsius to about 593° Celsius. The evaporation of a portion of the atomized stream of fluid can cause a cooling of the air and, thus, a cooling of the ribbon of glass-forming material 103.

In some embodiments, the fluid source 305 can be coupled to the plurality of cooling tubes 303. For example, the plurality of cooling tubes 303 can comprise a first cooling tube 309, a second cooling tube 311, and a third cooling tube 313. The fluid source 305 can be coupled to the first cooling tube 309 via a first fluid line 315 through which the cooling fluid can flow to the first cooling tube 309. The fluid source 305 can be coupled to the second cooling tube 311 via a second fluid line 317 through which the cooling fluid can flow to the second cooling tube 311. The fluid source 305 can be coupled to the third cooling tube 313 via a third fluid line 319 through which the cooling fluid can flow to the third cooling tube 313. In some embodiments, the fluid lines 315, 317, 319 can comprise a conduit (e.g., a tube, a pipe, etc.) that may be substantially hollow and through which the cooling fluid can be conveyed. In some embodiments, the fluid source 305 can be coupled to a purifier 321 that can purify the cooling fluid from the fluid source 305. For example, the purifier 321 can remove unwanted materials, for example, impurities, particulates, chemicals, etc. that may be present in the cooling fluid supplied from the fluid source 305. The purifier 321 can be coupled to the fluid source 305 at an inlet of the purifier 321, and the purifier 321 may be coupled to the first fluid line 315, the second fluid line 317, and the third fluid line 319 at an outlet of the purifier 321. In some embodiments, the purifier 321 can purify the cooling fluid from the fluid source 305 and deliver the purified cooling fluid to the first cooling tube 309 (e.g., via the first fluid line 315), the second cooling tube 311 (e.g., via the second fluid line 317), and the third cooling tube 313 (e.g., via the third fluid line 319).

In some embodiments, the gas source 307 can be coupled to the plurality of cooling tubes 303. For example, the gas source 307 can be coupled to the first cooling tube 309 via a first gas line 323 through which the compressed gas can flow to the first cooling tube 309. The gas source 307 can be coupled to the second cooling tube 311 via a second gas line 325 through which the compressed gas can flow to the second cooling tube 311. The gas source 307 can be coupled to the third cooling tube 313 via a third gas line 327 through which the compressed gas can flow to the third cooling tube 313. In some embodiments, the gas lines 323, 325, 327 can comprise a conduit (e.g., a tube, a pipe, etc.) that may be substantially hollow and through which the compressed gas can be conveyed. In some embodiments, the cooling apparatus 301 can comprise one or more valves 329. For example, the valves 329 can be coupled to one or more of the first fluid line 315, the second fluid line 317, the third fluid line 319, the first gas line 323, the second gas line 325, or the third gas line 327. The valves 329 can be selectively opened and closed to control the flow of cooling fluid and/or compressed gas through the lines and to the first cooling tube 309, the second cooling tube 311, and/or the third cooling tube 313.

While FIG. 3 illustrates the plurality of cooling tubes 303 comprising three cooling tubes (e.g., the first cooling tube 309, the second cooling tube 311, and the third cooling tube 313), the plurality of cooling tubes 303 can comprise greater than or less than three cooling tubes. In some embodiments, the first cooling tube 309, the second cooling tube 311, and the third cooling tube 313 may be substantially identical in structure and function. As such, a description herein of the first cooling tube 309 and associated components attached to the first cooling tube 309 may be substantially identical to other cooling tubes of the plurality of cooling tubes 303. In some embodiments, the first cooling tube 309 can extend substantially parallel to the travel path 221 and can extend across the travel direction 154. In some embodiments, by extending across the travel direction 154, the first cooling tube 309 can extend substantially perpendicular to the travel direction 154. For example, in some embodiments, the first cooling tube 309 can extend linearly along a first cooling axis 331. The first cooling axis 331 can be substantially perpendicular to the travel direction 154. The first cooling tube 309 is not limited to such an orientation, however, and in some embodiments, the first cooling tube 309 can extend across the travel direction 154 by forming an angle relative to the travel direction 154 that may be greater than or less than 90 degrees relative to the travel direction. In some embodiments, the first cooling tube 309 can comprise a substantially hollow conduit (e.g., pipe, duct, hose, etc.) through which the cooling fluid and the compressed gas can travel. As will be described herein, the first cooling tube 309 can comprise a plurality of orifices that may be spaced apart along the first cooling tube 309, with an atomized stream of fluid (e.g., comprising the cooling fluid and the compressed gas) being discharged through the orifices toward the ribbon of glass-forming material 103. In addition, or in the alternative, in some embodiments, the plurality of cooling tubes 303 can be rotated about their axes. For example, the first cooling tube 309 can be rotated about the first cooling axis 331, such that the first cooling tube 309 can direct the atomized stream of fluid upwardly and/or downwardly.

Figure 4:
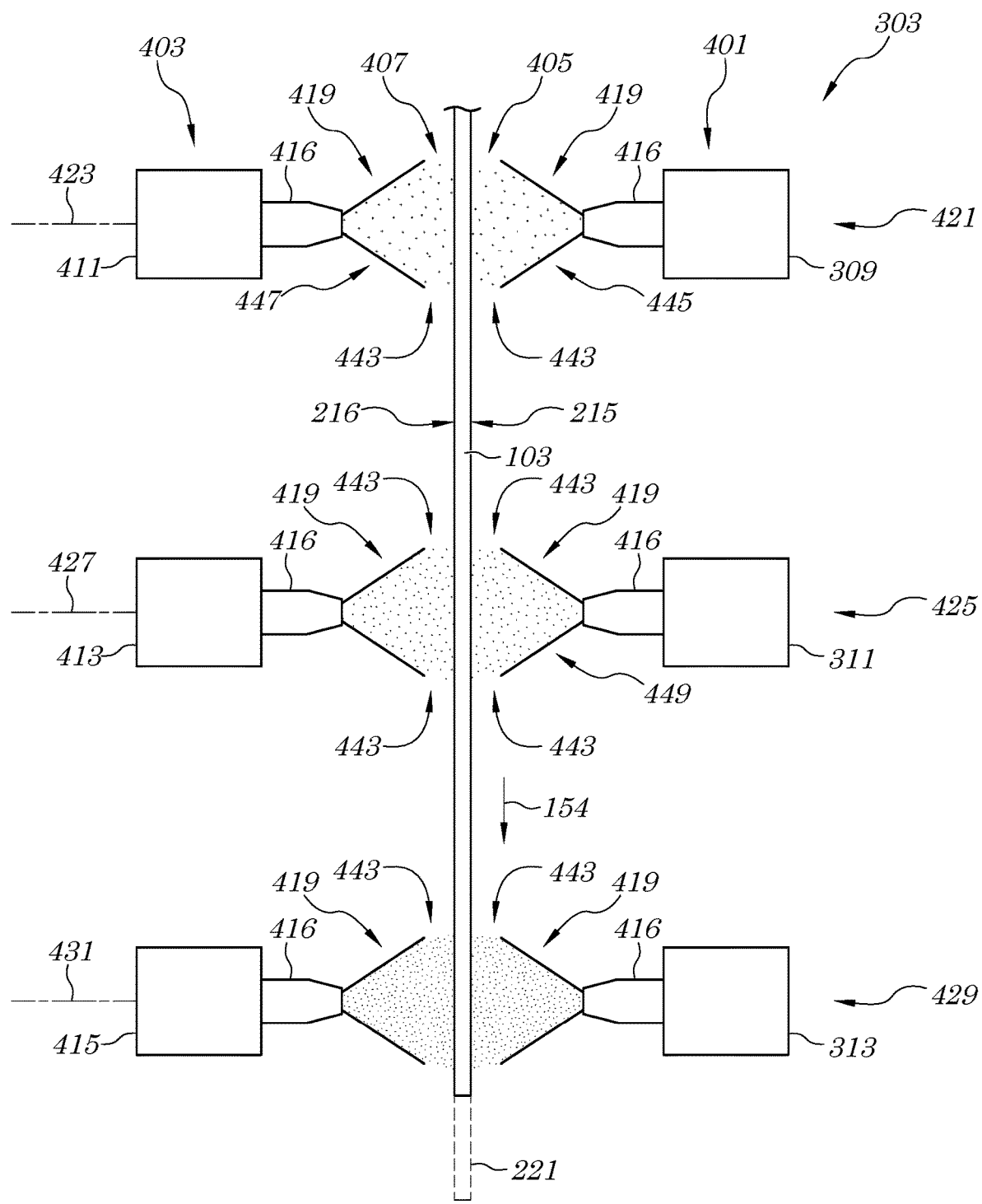
FIG. 4 illustrates a side view of a plurality of cooling tubes of the glass manufacturing apparatus along line 4-4 of FIG. 3 in accordance with embodiments of the disclosure.

Referring to FIG. 4, a side view of the plurality of cooling tubes 303 along line 4-4 of FIG. 3 is illustrated. In some embodiments, the plurality of cooling tubes 303 may be positioned on opposing sides of the travel path 221. For example, a first set 401 of the plurality of cooling tubes 303 can be positioned on a first side 405 of the travel path 221, while a second set 403 of the plurality of cooling tubes 303 can be positioned on a second side 407 of the travel path 221. In some embodiments, the first set 401 can comprise the first cooling tube 309, the second cooling tube 311, and the third cooling tube 313 (e.g., illustrated in FIG. 3). In some embodiments, the second set 403 can comprise a fourth cooling tube 411, a fifth cooling tube 413, and a sixth cooling tube 415. The second cooling tube 311, the third cooling tube 313, the fourth cooling tube 411, the fifth cooling tube 413, and the sixth cooling tube 415 may be substantially identical to the first cooling tube 309. In some embodiments, a plurality of nozzles 416 can be attached to the cooling tubes 309, 311, 313, 411, 413, 415, and atomized streams of fluid 419 can be discharged from the cooling tubes 309, 311, 313, 411, 413, 415 (e.g., through the plurality of nozzles 416) toward the travel path 221 along which the ribbon of glass-forming material 103 travels.

In some embodiments, the first set 401 of the plurality of cooling tubes 303 and the second set 403 of the plurality of cooling tubes 303 can be spaced apart along the travel direction 154. For example, the cooling tubes 309, 311, 313 of the first set 401 of the plurality of cooling tubes 303 may be sequentially spaced apart along the travel direction 154. In some embodiments, the second cooling tube 311 can be spaced apart from the first cooling tube 309 along the travel direction 154 such that the second cooling tube 311 may be positioned downstream from the first cooling tube 309. The third cooling tube 313 can be spaced apart from the second cooling tube 311 along the travel direction 154 such that the third cooling tube 313 may be positioned downstream from the second cooling tube 311. In some embodiments, the cooling tubes 411, 413, 415 of the second set 403 of the plurality of cooling tubes 303 may be sequentially spaced apart along the travel direction 154. For example, the fifth cooling tube 413 can be spaced apart from the fourth cooling tube 411 along the travel direction 154 such that the fifth cooling tube 413 may be positioned downstream from the fourth cooling tube 411. The sixth cooling tube 415 can be spaced apart from the fifth cooling tube 413 along the travel direction 154 such that the sixth cooling tube 415 may be positioned downstream from the fifth cooling tube 413. In some embodiments, the cooling tubes 309, 311, 313, 411, 413, 415 of the first set 401 and the second set 403 can be positioned on opposing sides of the travel path 221 at matching elevations. For example, the first cooling tube 309 and the fourth cooling tube 411 can be arranged as a first row 421 at a first elevation, in which a first elevational axis 423 that may be perpendicular to the travel path 221 can intersect the first cooling tube 309 and the fourth cooling tube 411. The second cooling tube 311 and the fifth cooling tube 413 can be arranged as a second row 425 at a second elevation, wherein a second elevational axis 427 that may be perpendicular to the travel path 221 can intersect the second cooling tube 311 and the fifth cooling tube 413. The third cooling tube 313 and the sixth cooling tube 415 can be arranged as a third row 429 at a third elevation, wherein a third elevational axis 431 that may be perpendicular to the travel path 221 can intersect the third cooling tube 313 and the sixth cooling tube 415.

In some embodiments, the cooling tubes 309, 311, 313, 411, 413, 415 of the first set 401 and the second set 403 of the plurality of cooling tubes 303 are not limited to being arranged in rows (e.g., the first row 421, the second row 425, the third row 429) with opposing cooling tubes at matching elevations. Rather, in some embodiments, the cooling tubes 309, 311, 313 of the first set 401 can be staggered relative to the cooling tubes 411, 413, 415 of the second set 403. For example, in some embodiments, the first elevational axis 423 may intersect one cooling tube (e.g., the first cooling tube 309 or the fourth cooling tube 411) but not another cooling tube (e.g., the other of the first cooling tube 309 or the fourth cooling tube 411). In addition, or in the alternative, the second elevational axis 427 may intersect one cooling tube (e.g., the second cooling tube 311 or the fifth cooling tube 413), but not another cooling tube. In addition, or in the alternative, in some embodiments, the third elevational axis 431 may intersect one cooling tube (e.g., the third cooling tube 313 or the sixth cooling tube 415), but not another cooling tube. As such, in some embodiments, an axis perpendicular to the travel path 221 can intersect zero cooling tubes, one cooling tube, or two cooling tubes. While the first set 401 and the second set 403 are illustrated as comprising the same number of cooling tubes (e.g., three cooling tubes in the first set 401 and three cooling tubes in the second set 403), the first set 401 and the second set 403 may comprise a different number of cooling tubes, for example, with the first set 401 comprising more cooling tubes or fewer cooling tubes than the second set 403.

In some embodiments, methods of producing the glass ribbon 104 can comprise directing the one or more atomized streams of fluid 419 toward an area 443 of the ribbon of glass-forming material 103. For example, directing the one or more atomized streams of fluid 419 can comprise directing a first atomized stream of fluid 445 toward the first side 405 of the ribbon of glass-forming material 103 and directing a second atomized stream of fluid 447 toward the second side 407 of the ribbon of glass-forming material 103. In some embodiments, the first atomized stream of fluid 445 and the second atomized stream of fluid 447 can be directed at opposing sides (e.g., the first side 405 and the second side 407) of the ribbon of glass-forming material 103 at the same elevation along the first elevational axis 423. The first atomized stream of fluid 445 and the second atomized stream of fluid 447 can therefore cool the ribbon of glass-forming material 103 at the first elevation.

In some embodiments, directing the one or more atomized streams of fluid 419 can comprise directing a third atomized stream of fluid 449 toward the first side 405 of the ribbon of glass-forming material 103 downstream from the first atomized stream of fluid 445 relative to the travel direction 154. For example, the first atomized stream of fluid 445 can be directed toward the first side 405 of the ribbon of glass-forming material 103 along the first elevational axis 423 while the third atomized stream of fluid 449 can be directed toward the first side 405 of the ribbon of glass-forming material 103 along the second elevational axis 427. The second elevational axis 427 may be spaced a distance apart from the first elevational axis 423 downstream from the first elevational axis 423 relative to the travel direction 154. The third atomized stream of fluid 449 can therefore be directed toward the first side 405 of the ribbon of glass-forming material 103 downstream from the first atomized stream of fluid 445 relative to the travel direction 154. In some embodiments, by directing the one or more atomized streams of fluid 419, 445, 447, 449 toward a plurality of locations of the ribbon of glass-forming material 103, for example, the first side 405, the second side 407, and at a plurality of elevations (e.g., along elevational axes 423, 427, 431) relative to the travel direction 154, a temperature of the ribbon of glass-forming material 103 can be controlled at a plurality of locations. In some embodiments, additional atomized streams of fluid can be directed toward the second side 407 of the ribbon of glass-forming material 103 along additional elevations. For example, additional atomized streams of fluid can be directed toward the second side 407 at locations downstream from the second atomized stream of fluid 447 relative to the travel direction 154, for example, along the second elevational axis 427, the third elevational axis 431, etc. Similarly, additional atomized streams of fluid can be directed toward the first side 405 of the ribbon of glass-forming material 103 downstream from the third atomized stream of fluid 449 relative to the travel direction 154, for example, along the third elevational axis 431.

Figure 5:
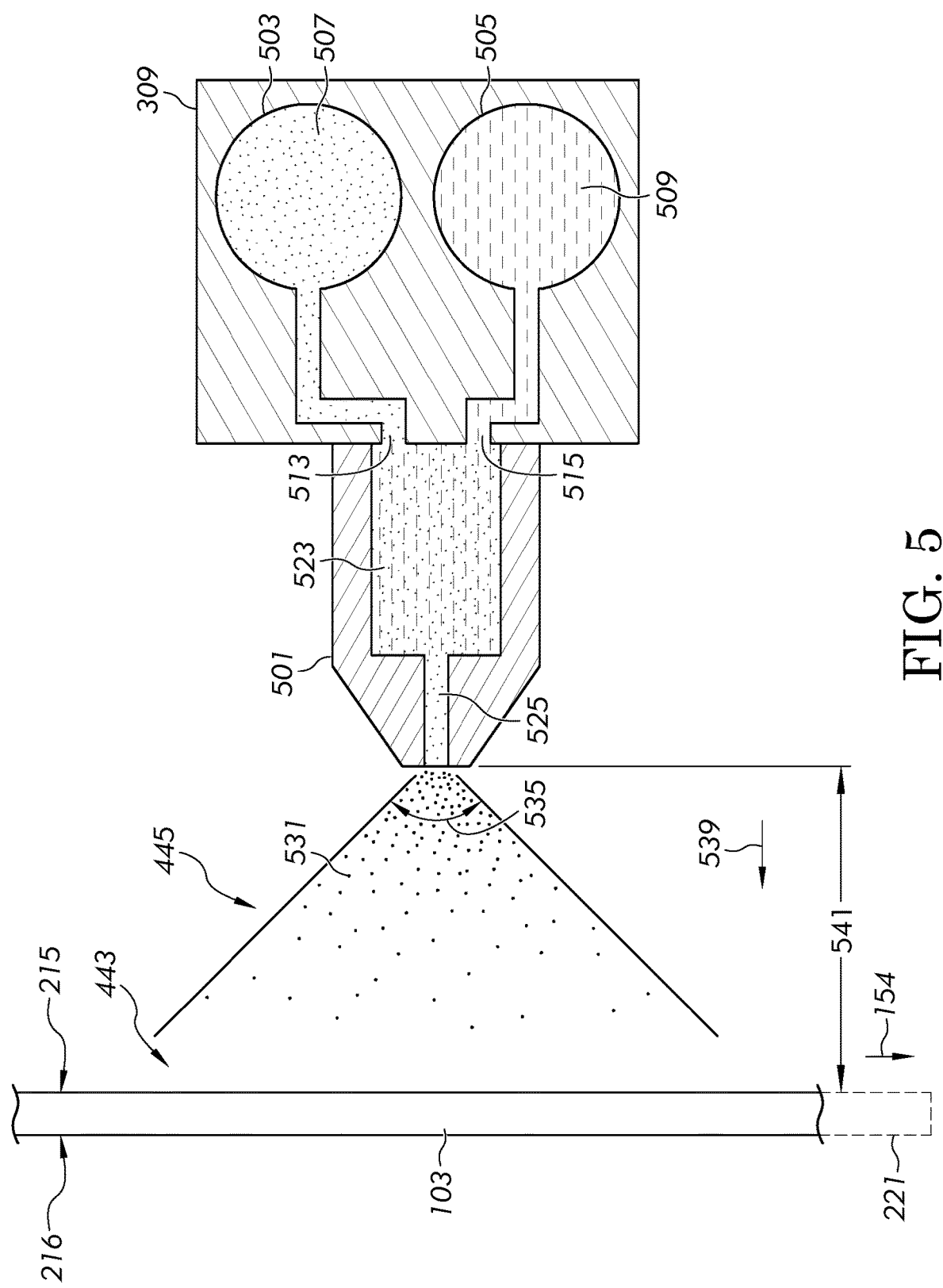
FIG. 5 illustrates a sectional view of a first cooling tube of the plurality of cooling tubes along line 5-5 of FIG. 3 in accordance with embodiments of the disclosure.

Referring to FIG. 5, a sectional illustration of the first cooling tube 309 along line 5-5 of FIG. 3 is illustrated. In some embodiments, the first cooling tube 309 can be substantially hollow and may comprise one or more chambers for delivering cooling fluid and compressed gas to a first nozzle 501. For example, the first cooling tube 309 can comprise a first chamber 503 and a second chamber 505. The first chamber 503 and the second chamber 505 can extend along a length of the first cooling tube 309. In some embodiments, the first chamber 503 can be coupled to the first gas line 323 (e.g., illustrated in FIG. 3). The first chamber 503 can be in fluid communication with the first gas line 323, such that the first cooling tube 309 can receive compressed gas 507 within the first chamber 503 from the first gas line 323. In some embodiments, the second chamber 505 can be coupled to the first fluid line 315 (e.g., illustrated in FIG. 3). The second chamber 505 can be in fluid communication with the first fluid line 315, such that the first cooling tube 309 can receive cooling fluid 509 within the second chamber 505 from the first fluid line 315.

In some embodiments, the first cooling tube 309 can comprise a first orifice 513 and a second orifice 515 facing the travel path 221. For example, by facing the travel path 221, an axis perpendicular to the travel path 221 can extend from the travel path 221 toward the first cooling tube 309 and may intersect the first orifice 513 prior to intersecting another portion of the first cooling tube 309. In some embodiments, by facing the travel path 221, another axis perpendicular to the travel path 221 can extend from the travel path 221 toward the first cooling tube 309 and may intersect the second orifice 515 prior to intersecting another portion of the first cooling tube 309. In some embodiments, the first orifice 513 and the second orifice 515 can be in fluid communication with the first chamber 503 and the second chamber 505, respectively. For example, the first orifice 513 can be in fluid communication with the first chamber 503 via a first passageway that extends between the first orifice 513 and the first chamber 503. The second orifice 515 can be in fluid communication with the second chamber 505 via a second passageway that extends between the second orifice 515 and the second chamber 505. In some embodiments, the compressed gas 507 can be delivered to the first orifice 513 from the first chamber 503, while the cooling fluid 509 can be delivered to the second orifice 515 from the second chamber 505.

In some embodiments, one or more nozzles of the plurality of nozzles 416 (e.g., illustrated in FIG. 4) can be attached to the first cooling tube 309 and may be in fluid communication with the first orifice 513 and the second orifice 515 in the first cooling tube 309. The one or more nozzles can discharge atomized streams of fluid toward the travel path 221. The one or more nozzles can be attached to the first cooling tube 309 in a substantially identical manner. For example, a first nozzle 501 of the plurality of nozzles 416 can be attached to the first cooling tube 309 and may be in fluid communication with the first orifice 513 and the second orifice 515. The first nozzle 501 can be attached to the first cooling tube 309 in several ways. For example, in some embodiments, the first nozzle 501 can be attached via threading, wherein one of the first nozzle 501 or the first cooling tube 309 comprises a male threaded portion while the other of the first nozzle 501 or the first cooling tube 309 comprises a female threaded portion. The first nozzle 501 can be threaded onto the first cooling tube 309 to reduce the likelihood of inadvertent detachment of the first nozzle 501 from the first cooling tube 309. The first nozzle 501 and the first cooling tube 309 are not limited to a threading engagement, and in some embodiments, the first nozzle 501 can be attached to the first cooling tube 309 via a mechanical fastener (e.g., adhesive, locking mechanism, etc.). In some embodiments, the first nozzle 501 can be formed with the first cooling tube 309, for example, wherein the first nozzle 501 and the first cooling tube 309 comprise a unitary structure. It will be appreciated that while the first nozzle 501 can be attached to the first cooling tube 309 in several ways, the first nozzle 501 can receive the compressed gas 507 and the cooling fluid 509 from the first cooling tube 309 and discharge the first atomized stream of fluid 445 toward the travel path 221.

In some embodiments, the first nozzle 501 may be substantially hollow and may define a first mixing chamber 523. The first mixing chamber 523 may be surrounded by one or more walls of the first nozzle 501. The first mixing chamber 523 can be in fluid communication with the first orifice 513 and the second orifice 515 of the first cooling tube 309, such that the first mixing chamber 523 can receive the compressed gas 507 from the first orifice 513 and the cooling fluid 509 from the second orifice 515. In some embodiments, the compressed gas 507 can flow from the first chamber 503 in the first cooling tube 309, through the first orifice 513, and into the first mixing chamber 523. The cooling fluid 509 can flow from the second chamber 505 in the first cooling tube 309, through the second orifice 515, and into the first mixing chamber 523. In some embodiments, the first nozzle 501 can comprise a first nozzle orifice 525 defined at an end of the first nozzle 501 opposite the first cooling tube 309. The first nozzle orifice 525 can be oriented to face the travel path 221. In some embodiments, the first nozzle orifice 525 may be in fluid communication with the first mixing chamber 523. For example, the first nozzle orifice 525 can receive a mixture of the compressed gas 507 and the cooling fluid 509 from the first mixing chamber 523 and discharge the mixture of the compressed gas 507 and the cooling fluid 509 as the first atomized stream of fluid 445 from the first nozzle orifice 525 toward the travel path 221.

In some embodiments, the first nozzle 501 can discharge one or more droplets 531 of the first atomized stream of fluid 445. For example, the first nozzle 501 can convert the mixture of the compressed gas 507 and the cooling fluid 509 via an atomization process into the first atomized stream of fluid 445 comprising the one or more droplets 531. In some embodiments, the atomization process can reduce the cooling fluid 509 from a liquid form into the one or more droplets 531. The one or more droplets 531 can comprise a diameter that may be within a range from about 0.5 micrometers to about 3 micrometers. In some embodiments, the first mixing chamber 523 can receive the mixture of the compressed gas 507 and the cooling fluid 509. The first mixing chamber 523 may be maintained at a higher pressure than ambient environment, such that the mixture of the compressed gas 507 and the cooling fluid 509 can flow through the first nozzle orifice 525 and may be discharged from the first nozzle 501. In some embodiments, the first nozzle 501 can discharge the first atomized stream of fluid 445 within a spray angle 535 range from about 0 degrees to about 180 degrees, or within a spray angle 535 range from about 0 degrees to about 90 degrees, or within a spray angle 535 range from about 20 degrees to about 90 degrees. The spray angle 535 can be varied in several ways. For example, a cross-sectional size (e.g., diameter) of the first nozzle orifice 525 can be altered, which can correspondingly alter the spray angle 535.

In some embodiments, a portion of the first atomized stream of fluid 445 can evaporate prior to reaching the travel path 221. For example, the first atomized stream of fluid 445 can exit the first nozzle orifice 525 and may travel along a discharge direction 539 toward the travel path 221. In some embodiments, as the first atomized stream of fluid 445 travels along the discharge direction 539, a portion of the first atomized stream of fluid 445 can evaporate. For example, an ambient temperature surrounding the first nozzle 501 may be high enough (e.g., within a range from about 315° Celsius to about 593° Celsius) to cause at least some of the one or more droplets 531 to evaporate after being discharged from the first nozzle orifice 525 but before reaching the ribbon of glass-forming material 103 traveling along the travel path 221. The first nozzle 501 can be spaced a discharge distance 541 from the travel path 221. In some embodiments, a density of the one or more droplets 531 of the first atomized stream of fluid 445 can be greater from the first nozzle orifice 525 to a midpoint of the discharge distance 541 (e.g., about halfway between an end of the first nozzle 501 and the ribbon of glass-forming material 103) than from the midpoint of the discharge distance 541 to the ribbon of glass-forming material 103. This may be due, in part, to some of the one or more droplets 531 evaporating while traveling along the discharge direction 539. In some embodiments, the portion of the first atomized stream of fluid 445 that evaporates prior to reaching the travel path 221 can comprise all of the first atomized stream of fluid 445, such that none of the one or more droplets 531 reach the travel path 221 to contact the ribbon of glass-forming material 103. In some embodiments, the portion of the first atomized stream of fluid 445 that evaporates prior to reaching the travel path 221 can comprise less than all of the first atomized stream of fluid 445. For example, some of the first atomized stream of fluid 445 may not evaporate prior to reaching the travel path 221 and contacting the ribbon of glass-forming material 103, in which case some of the one or more droplets 531 may contact the ribbon of glass-forming material 103. However, the amount of the one or more droplets 531 that do not evaporate but, rather, reach the travel path 221 and contact the ribbon of glass-forming material 103 may be small enough so as not to affect the quality of the ribbon of glass-forming material 103.

The evaporation of the portion of the first atomized stream of fluid 445 yields several benefits. For example, when the portion of the first atomized stream of fluid 445 evaporates, the one or more droplets 531 may change from a liquid to a gas, which can cause a reduction in air temperature. In some embodiments, when the portion of the first atomized stream of fluid 445 evaporates, the air temperature adjacent to the ribbon of glass-forming material 103 traveling along the travel path 221 may be reduced, which can cause the ribbon of glass-forming material 103 adjacent to the first atomized stream of fluid 445 to cool. Due to the glass manufacturing apparatus 100 comprising a plurality of nozzles that are attached to the cooling tubes, the temperature of the ribbon of glass-forming material 103 along a direction that may be perpendicular to the travel direction 154 can be cooled. In some embodiments, a dehumidifier may be provided to reduce humidity adjacent to the glass-forming material 103 to counteract a rise in humidity as a result of the evaporation of the atomized streams of fluid. In addition, due to the portion of the first atomized stream of fluid 445 evaporating prior to contacting the ribbon of glass-forming material 103 (e.g., wherein the portion comprises some or all of the first atomized stream of fluid 445) contact between the one or more droplets 531 and the ribbon of glass-forming material 103 may be limited.

In some embodiments, methods of producing the glass ribbon 104 can comprise converting the cooling fluid 509 into the one or more atomized streams of fluid 419 (e.g., illustrated in FIG. 4). For example, the cooling fluid 509 can be supplied to the second chamber 505 of the first cooling tube 309 via the first fluid line 315 (e.g., illustrated in FIG. 3). The cooling fluid 509 can be mixed with the compressed gas 507 in the first mixing chamber 523 of the first nozzle 501. In some embodiments, the mixture of the cooling fluid 509 and the compressed gas 507 can form the first atomized stream of fluid 445 of the one or more atomized streams of fluid 419 upon being discharged from the first nozzle orifice 525 of the first nozzle 501. In some embodiments, methods of producing the glass ribbon 104 can comprise cooling the ribbon of glass-forming material 103 by evaporating a portion of the one or more atomized streams of fluid 419 (e.g., illustrated in FIG. 4) without contacting the portion of the one or more atomized streams of fluid 419 with the area 443 of the ribbon of glass-forming material 103. For example, the one or more atomized streams of fluid 419 can evaporate as the atomized stream travels along the discharge direction 539 toward the ribbon of glass-forming material 103. At least some of the one or more droplets 531 may evaporate due to the high temperature of the ambient air surrounding the ribbon of glass-forming material 103. In some embodiments, the evaporation of the one or more droplets 531 can cause a reduction in air temperature near the area 443 of the ribbon of glass-forming material 103. This reduction in air temperature can cause a corresponding decrease in temperature of the area 443 of the ribbon of glass-forming material 103. In some embodiments, methods of producing the glass ribbon 104 can comprise cooling the ribbon of glass-forming material 103 into the glass ribbon 104. For example, downstream from a location where the one or more atomized streams of fluid 419 are directed toward the ribbon of glass-forming material 103, the ribbon of glass-forming material 103 can be separated (e.g., illustrated in FIG. 1) and/or cooled into the glass ribbon 104.

Figure 6:
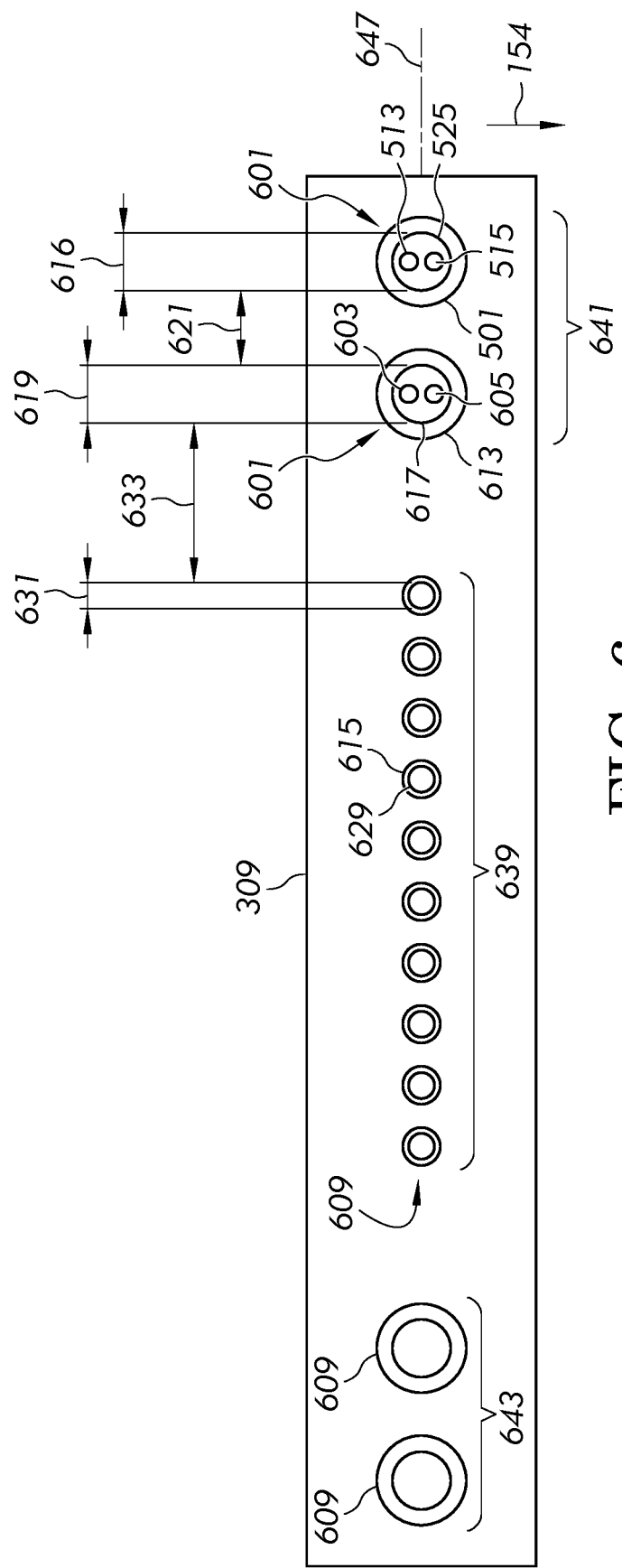
FIG. 6 illustrates a front view of the first cooling tube of the plurality of cooling tubes along line 6-6 of FIG. 3 in accordance with embodiments of the disclosure.

Referring to FIG. 6, a front view of the first cooling tube 309 along line 6-6 of FIG. 3 is illustrated. It will be appreciated that each of the plurality of cooling tubes 303 (e.g., illustrated in FIG. 3) may be substantially similar in structure and function to the first cooling tube 309 illustrated in FIGS. 5-6. For example, the first cooling tube 309 can comprise a plurality of orifices 601 spaced apart along the first cooling tube 309 and facing the travel path 221 (e.g., illustrated in FIGS. 3-5). In some embodiments, while one nozzle was illustrated in FIG. 5, the nozzle (e.g., the first nozzle 501) can comprise a plurality of nozzles 609 sequentially spaced across the travel direction 154 (e.g., illustrated in FIG. 5) and in fluid communication with the plurality of orifices 601. For example, in some embodiments, the plurality of orifices 601 can comprise the first orifice 513, the second orifice 515, a third orifice 603, a fourth orifice 605, etc. The first orifice 513, the second orifice 515, the third orifice 603, and the fourth orifice 605 are illustrated with dashed lines due to being obstructed from view by the nozzles (e.g., the first nozzle 501 and a second nozzle 613). The first cooling tube 309 can comprise additional orifices that may be in fluid communication with the plurality of nozzles 609 that may be attached to the first cooling tube 309, though, the additional orifices are obstructed from view by the nozzles. In some embodiments, the first orifice 513 and the second orifice 515 can be spaced apart from the third orifice 603 and the fourth orifice 605. The first orifice 513 and the second orifice 515 can be in fluid communication with the first nozzle 501, while the third orifice 603 and the fourth orifice 605 may be in fluid communication with the second nozzle 613. The third orifice 603 and the fourth orifice 605 may be similar in structure and function to the first orifice 513 and the second orifice 515 (e.g., also illustrated in FIG. 5), in which the first orifice 513 and the third orifice 603 can receive compressed gas 507 from the first chamber 503 (e.g., illustrated in FIG. 5) while the second orifice 515 and the fourth orifice 605 can receive cooling fluid 509 from the second chamber 505 (e.g., illustrated in FIG. 5).

In some embodiments, the plurality of nozzles 609 can be in fluid communication with the plurality of orifices 601, with the plurality of nozzles 609 configured to discharge atomized streams of fluid toward the travel path 221. For example, each nozzle of the plurality of nozzles 609 can be in fluid communication with a corresponding one or more orifices of the plurality of orifices 601. In some embodiments, each nozzle of the plurality of nozzles 609 can discharge the atomized streams of fluid toward the travel path 221 (e.g., illustrated in FIG. 5). In some embodiments, the plurality of nozzles 609 can comprise the first nozzle 501, the second nozzle 613, and a third nozzle 615. In some embodiments, the first nozzle orifice 525 of the first nozzle 501 of the plurality of nozzles 609 can comprise a first diameter 616. In some embodiments, a second nozzle orifice 617 of the second nozzle 613 of the plurality of nozzles 609 can comprise a second diameter 619 that may be equal to the first diameter 616. In some embodiments, the plurality of nozzles 609 can comprise a set of sequentially spaced nozzles comprising the first nozzle 501 and the second nozzle 613 spaced a first distance 621 from the first nozzle 501. In some embodiments, the first nozzle 501 and the second nozzle 613 may be sequentially spaced with no intervening nozzles positioned between the first nozzle 501 and the second nozzle 613.

In some embodiments, the third nozzle 615 of the plurality of nozzles 609 can be spaced a second distance 633 from the second nozzle 613, with the second nozzle 613 positioned in series between the first nozzle 501 and the third nozzle 615, and the first distance 621 different than the second distance 633. For example, the second nozzle 613 and the third nozzle 615 can be sequentially spaced with no intervening nozzles positioned between the second nozzle 613 and the third nozzle 615. In some embodiments, by being positioned in series, the second nozzle 613 may be positioned between the first nozzle 501 and the third nozzle 615, wherein an axis can intersect the first nozzle 501, the second nozzle 613, the third nozzle 615, and the other nozzles (e.g., the plurality of nozzles 609). In some embodiments, the first distance 621 may be different than the second distance 633. For example, the first distance 621 may be less than the second distance 633, such that the first nozzle 501 and the second nozzle 613 can be positioned closer together than the second nozzle 613 and the third nozzle 615. In some embodiments, a third nozzle orifice 629 of the third nozzle 615 can comprise a third diameter 631, wherein the third diameter 631 may be different than the first diameter 616 and/or the second diameter 619. For example, in some embodiments, the first diameter 616 and the second diameter 619 may be larger than the third diameter 631.

In some embodiments, a spacing between adjacent nozzles of the plurality of nozzles 609 may be non-constant. For example, the plurality of nozzles 609 can comprise an inner group of nozzles 639, a first outer group of nozzles 641, and a second outer group of nozzles 643. The inner group of nozzles 639 can be positioned toward a center of the first cooling tube 309 while the first outer group of nozzles 641 and the second outer group of nozzles 643 may be positioned toward the ends of the first cooling tube 309. In some embodiments, the first outer group of nozzles 641 can comprise the first nozzle 501 and the second nozzle 613. The inner group of nozzles 639 can be positioned between the first outer group of nozzles 641 and the second outer group of nozzles 643. A diameter of the nozzle orifices of the first outer group of nozzles 641 (e.g., the first nozzle orifice 525 of the first nozzle 501 and the second nozzle orifice 617 of the second nozzle 613) and the second outer group of nozzles 643 may be larger than a diameter of the nozzle orifices (e.g., the third nozzle orifice 629 of the third nozzle 615) of the inner group of nozzles 639.

The larger diameter of the nozzle orifices of the first outer group of nozzles 641 and the second outer group of nozzles 643 may be due, in part, to varying cooling requirements across the ribbon of glass-forming material 103. For example, with brief reference to FIG. 1, the central portion 152 of the ribbon of glass-forming material 103 may comprise a thickness that may be less than a thickness of edge portions formed along the first outer edge 153 and the second outer edge 155 of the ribbon of glass-forming material 103. In some embodiments, cooling of the central portion 152 may be achieved with a smaller atomized stream of fluid than cooling of the first outer edge 153 and the second outer edge 155 that comprise edge portions. To accommodate the varying cooling rates due to thickness disparities across the ribbon of glass-forming material 103, the first outer group of nozzles 641 and the second outer group of nozzles 643 may provide a larger atomized stream of fluid than the inner group of nozzles 639. For example, the first outer group of nozzles 641 and the second outer group of nozzles 643 may comprise nozzle orifices with larger diameters than the diameters of the nozzle orifices of the inner group of nozzles 639. The larger diameters can allow for a larger atomized stream of fluid to be directed from the first outer group of nozzles 641 and the second outer group of nozzles 643. The larger streams can lead to greater evaporation of droplets, which can thus cause greater cooling of the ribbon of glass-forming material 103 near the first outer group of nozzles 641 and the second outer group of nozzles 643. In some embodiments, the cooling of the ribbon of glass-forming material 103 can further be controlled based on the spacing between adjacent nozzles. For example, a spacing between adjacent nozzles within the inner group of nozzles 639 may be less than a spacing between adjacent nozzles within the first outer group of nozzles 641 and/or the second outer group of nozzles 643. The reduced spacing between the inner group of nozzles 639 can allow for a greater number of nozzles to be provided as part of the inner group of nozzles 639, which can allow for more controlled cooling of the central portion 152 of the ribbon of glass-forming material 103.

Referring to FIGS. 4 and 6, in some embodiments, directing the one or more atomized streams of fluid 419 toward the area 443 of the ribbon of glass-forming material 103 can comprise varying an amount of the one or more atomized streams of fluid 419 directed toward the area 443 along an axis 647 perpendicular to the travel direction 154. For example, the nozzle orifices of the plurality of nozzles 609 can be varied in size, which can vary the amount of the one or more atomized streams of fluid 419 that may be directed toward the ribbon of glass-forming material 103. In some embodiments, larger nozzle orifices can yield larger atomized streams of fluid while smaller nozzle orifices can yield smaller atomized streams of fluid. In addition, or in the alternative, a spacing between adjacent nozzles of the plurality of nozzles 609 along the axis 647 can be varied, with some nozzles positioned closer together than other nozzles. In some embodiments, cooling the area 443 of the ribbon of glass-forming material 103 can comprise attaining a substantially uniform temperature of the ribbon of glass-forming material 103 along the axis 647 perpendicular to the travel direction 154. For example, edges 153, 155 (e.g., illustrated in FIG. 1) of the ribbon of glass-forming material 103 may be thicker than the central portion 152 of the ribbon of glass-forming material 103. To achieve more controlled and uniform cooling of the ribbon of glass-forming material 103, larger atomized streams of fluid may be directed toward the edges 153, 155 than the central portion 152. Greater cooling can therefore be achieved near the edges 153, 155 to accommodate for the increased thickness of the ribbon of glass-forming material 103, wherein the greater cooling at the edges 153, 155 can yield a substantially uniform temperature of the ribbon of glass-forming material 103.

Figure 7:
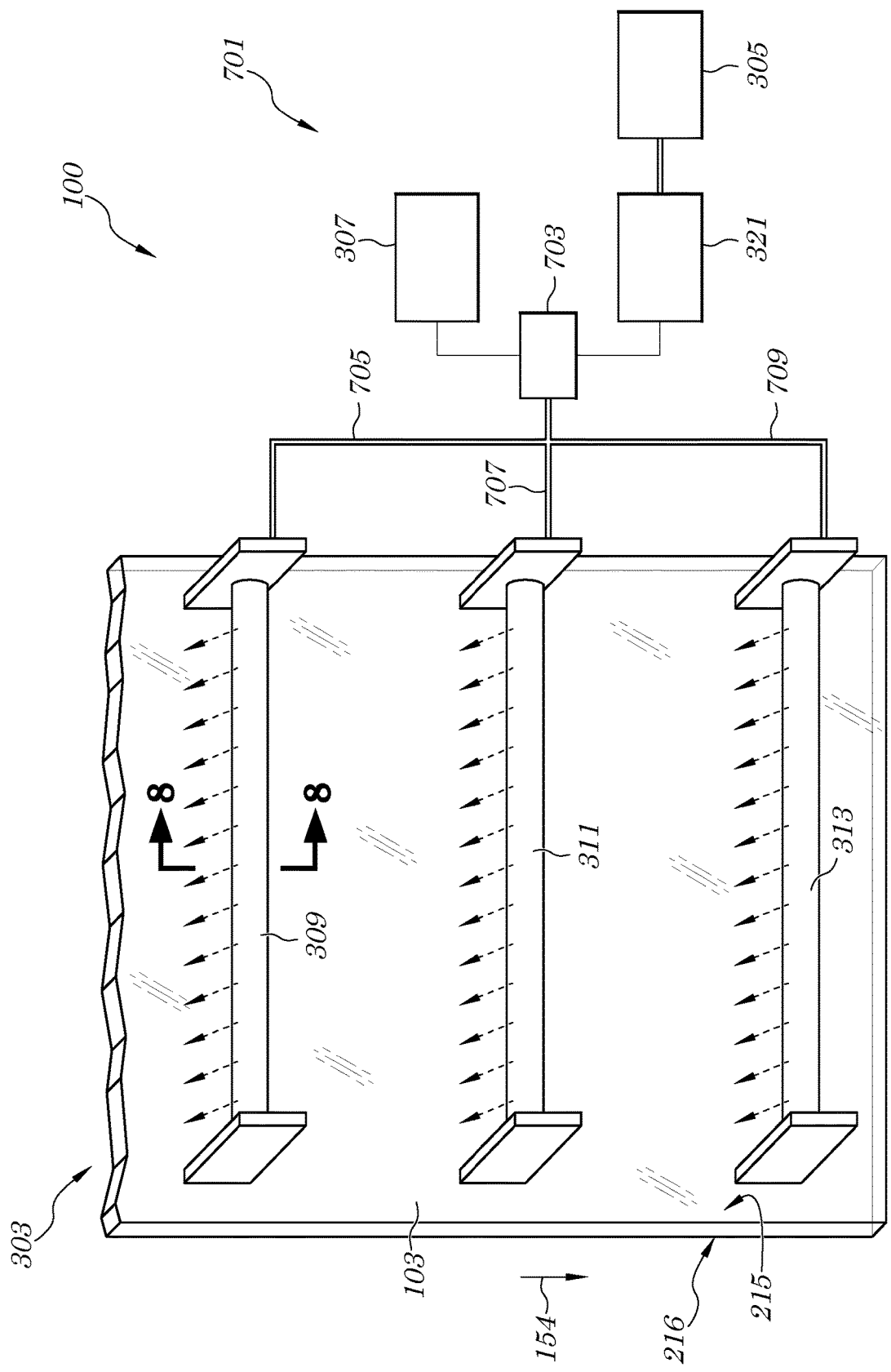
FIG. 7 illustrates an enlarged portion of additional embodiments of the glass manufacturing apparatus taken at view 3 of FIG. 1 in accordance with embodiments of the disclosure.

Referring to FIG. 7, further embodiments of a cooling apparatus 701 are illustrated. The cooling apparatus 701 can be similar in some respects to the cooling apparatus 301 illustrated and described relative to FIGS. 3-6. For example, the cooling apparatus 701 can comprise the fluid source 305, the gas source 307, the purifier 321, and the plurality of cooling tubes 303 (e.g., the first cooling tube 309, the second cooling tube 311, the third cooling tube 313, etc.). In some embodiments, the cooling apparatus 701 can comprise an atomizer 703 coupled to and in fluid communication with the gas source 307 and the purifier 321. The atomizer 703 can receive the compressed gas from the gas source 307 and the cooling fluid from the purifier 321. The atomizer 703 can comprise a chamber within which the compressed gas and the cooling fluid may mix to form an atomized stream of fluid. In some embodiments, the process of converting the mixture of compressed gas and cooling fluid into the atomized stream of fluid may be similar to the embodiments of FIGS. 5-6, wherein the mixing occurs within the first nozzle 501. However, the formation of the atomized stream of fluid is not limited to occurring within the first nozzle 501, and in some embodiments, the atomized stream of fluid can be generated upstream from the first nozzle 501, for example, at the atomizer 703. In some embodiments, a first atomization line 705 can be coupled to the atomizer 703 and the first cooling tube 309, such that a first atomized stream of fluid can be delivered from the atomizer 703, through the first atomization line 705, and to the first cooling tube 309. In some embodiments, a second atomization line 707 can be coupled to the atomizer 703 and the second cooling tube 311, such that a second atomized stream of fluid can be delivered from the atomizer 703, through the second atomization line 707, and to the second cooling tube 311. In some embodiments, a third atomization line 709 can be coupled to the atomizer 703 and the third cooling tube 313, such that a third atomized stream of fluid can be delivered from the atomizer 703, through the third atomization line 709, and to the third cooling tube 313. The atomized streams of fluid can be discharged from the plurality of cooling tubes 303 toward the ribbon of glass-forming material 103. In some embodiments, the cooling apparatus 701 can comprise one or more valves, for example, the valves 329 of the cooling apparatus 301 illustrated in FIG. 3. The valves 329 can be coupled to one or more of the first atomization line 705, the second atomization line 707, or the third atomization line 709. The valves 329 can be selectively opened and closed to control the flow of the mixture of compressed gas and cooling fluid through the lines 705, 707, 709 and to the first cooling tube 309, the second cooling tube 311, and/or the third cooling tube 313.

Figure 8:
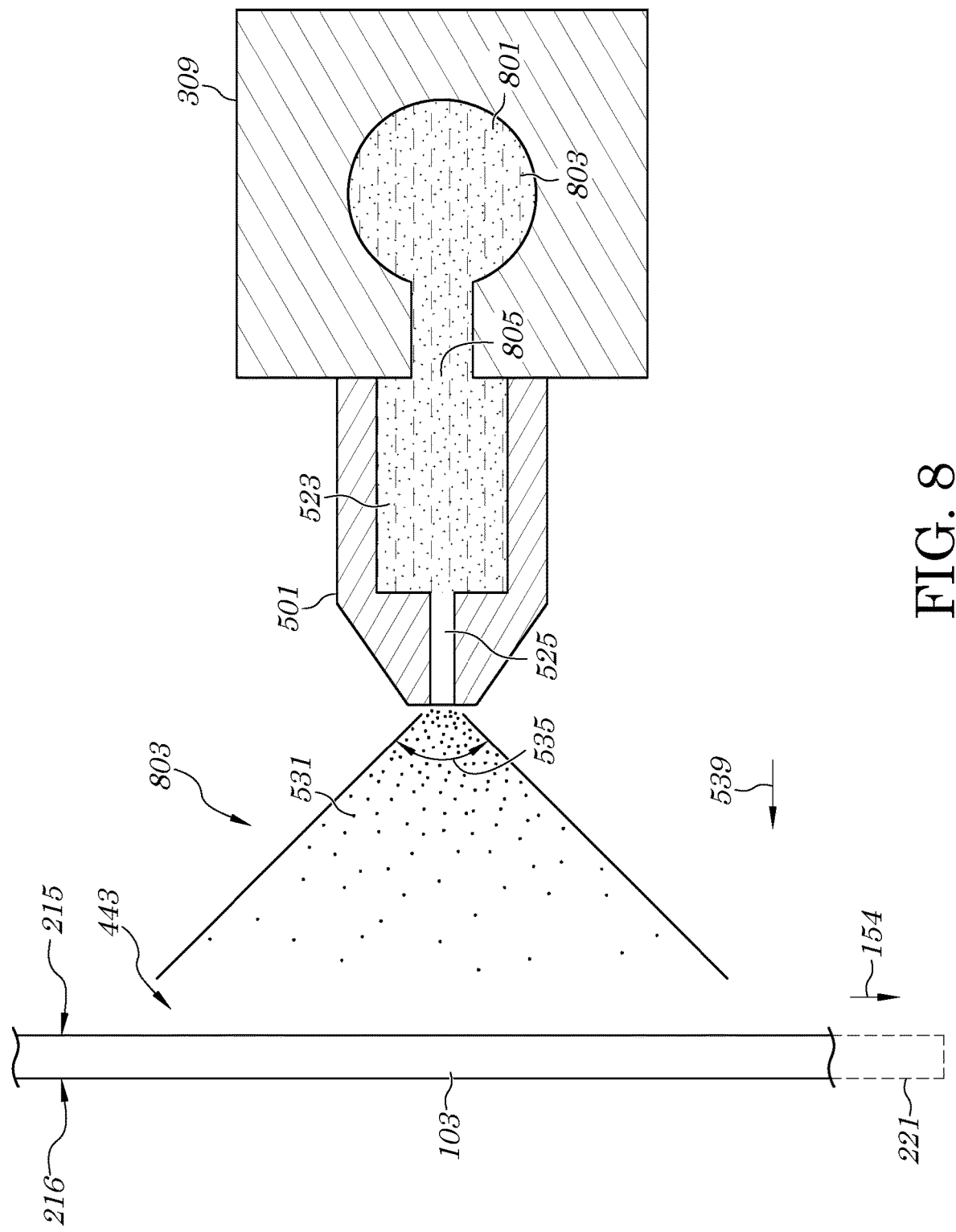
FIG. 8 illustrates a sectional view of additional embodiments of a first cooling tube of the plurality of cooling tubes along line 8-8 of FIG. 7 in accordance with embodiments of the disclosure.

FIG. 8 illustrates a sectional view of the first cooling tube 309 along line 8-8 of FIG. 7. In some embodiments, the first cooling tube 309 can be substantially hollow and may comprise a chamber 801 for delivering a first atomized stream of fluid 803 to the first nozzle 501. The chamber 801 can extend along a length of the first cooling tube 309. In some embodiments, the chamber 801 can be coupled to the first atomization line 705, for example, with the chamber 801 in fluid communication with the first atomization line 705 and configured to receive the first atomized stream of fluid 803 from the first atomization line 705. In some embodiments, the first cooling tube 309 can comprise an orifice 805 facing the travel path 221. The orifice 805 can be in fluid communication with the chamber 801, for example, via a passageway that extends between the chamber 801 and the orifice 805. In some embodiments, the first atomized stream of fluid 803 can be delivered to the orifice 805 from the chamber 801. The first atomized stream of fluid 803 can pass through the orifice 805 and may be received within the first mixing chamber 523 of the first nozzle 501. In some embodiments, the first atomized stream of fluid 803 can be discharged from the first nozzle orifice 525 of the first nozzle 501 in the discharge direction 539 toward the travel path 221. Similar to the embodiments of FIG. 5, a portion of the one or more droplets 531 of the first atomized stream of fluid 803 can evaporate prior to contacting the area 443 of the ribbon of glass-forming material 103, thus cooling the ribbon of glass-forming material 103.

In some embodiments, the glass manufacturing apparatus 100 can provide several benefits associated with cooling the ribbon of glass-forming material 103 that travels along the travel path 221. For example, the plurality of cooling tubes 303 can be positioned on opposing sides of the ribbon of glass-forming material 103 and spaced apart along the travel direction 154 of the glass manufacturing apparatus 100. In addition, the plurality of cooling tubes 303 can extend substantially perpendicular to the travel direction 154 along a width of the ribbon of glass-forming material 103. The plurality of cooling tubes 303 can direct atomized streams of fluid toward the ribbon of glass-forming material 103. In some embodiments, a portion of the atomized streams of fluid can evaporate prior to contacting the ribbon of glass-forming material 103. The evaporation can reduce an air temperature adjacent to the ribbon of glass-forming material 103, which can likewise cool the ribbon of glass-forming material 103. In addition, by evaporating the portion of the atomized streams of fluid, a number of droplets contacting the ribbon of glass-forming material 103 may be limited, thus reducing a risk of contaminating the ribbon of glass-forming material 103. The plurality of cooling tubes 303 can therefore cool the ribbon of glass-forming material 103 at a plurality of locations, for example, along the travel direction 154, perpendicular to the travel direction 154, and on opposing sides of the ribbon of glass-forming material 103. The cooling of the ribbon of glass-forming material 103 can be achieved with a reduced risk of contamination, since the atomized streams of fluid are limited from contacting the ribbon of glass-forming material 103. By providing more efficient cooling of the ribbon of glass-forming material 103, production rates can be increased.

FIGS. 9-12 illustrate another embodiment of the glass manufacturing apparatus of FIG. 1. As described herein below, a coolant directed toward the ribbon of molten material can undergo a phase change, for example, from a liquid or a solid to a gas. Methods of manufacturing glass in accordance with embodiments of the disclosure can inhibit (e.g., reduce, prevent, eliminate) problems associated with baggy warp. Providing a coolant that undergoes a phase change can absorb a large quantity of heat as it undergoes the phase change (e.g., latent heat, enthalpy of vaporization, enthalpy of sublimation). Additionally, providing a coolant that undergoes a phase change can absorb heat when it is heated to a temperature where it undergoes the phase change to a gas as well as when it is heated as a gas afterward. This increased cooling capacity can enable processing of molten material comprising a lower liquidus viscosity to a predetermined thickness (e.g., from 300 micrometers to about 5 millimeters) than would otherwise be possible. Further, directing the coolant toward a location on the ribbon of molten material positioned below the forming vessel can inhibit the incidence of devitrification (e.g., crystallization) on the forming vessel. As well, directing the coolant toward a location above the pull rollers can provide increased processing efficiency (e.g., reduced time, reduced space). For example, increased cooling capacity (e.g., above the pull rollers, below the forming device) can enable a reduction in the time between when the ribbon of molten material is drawn from the forming vessel and when it can undergo subsequent processing. Additionally, increased cooling capacity (e.g., above the pull rollers, below the forming device) can enable a reduction in a length of molten material travel path from when the ribbon of molten material is drawn from the forming vessel and when it can be handled (e.g., by pull rollers, for subsequent processing).

Additional features of embodiments of the disclosure can provide further technical benefits. For example, providing a mass flow rate of the coolant in a range from about 1 gram per minute (g/min) to about 200 g/min can enable increased cooling rates and/or cooling capacity without damaging the surface(s) of the ribbon of molten material being cooled. Also, providing a coolant comprising a small median particle size (e.g., 5 micrometers to about 20 micrometers) can inhibit (e.g., reduce, prevent, eliminate) the incidence of surface damage because it decreases the likelihood that a particle will impact a surface of the ribbon of molten material instead of and/or before undergoing a phase transition while still increasing the cooling rate and/or cooling capacity. Likewise, providing a coolant comprising a controlled, narrow particle size distribution (e.g., about 90% of the particles comprise a size in a range from about 1 micrometer to about 100 micrometers) can decrease (e.g., reduce) the likelihood that a particle will impact a surface of the ribbon of molten material instead of and/or before undergoing a phase transition while still increasing the cooling rate and/or cooling capacity. Either of the above particle size relationships can be enabled by heating the conduit (e.g., outlet of the conduit, nozzle) because such heating can inhibit (e.g., reduce, prevent, eliminate) agglomeration of particles. Additionally, positioning the nozzle near the ribbon of molten material (e.g., within a range from about 100 millimeters to about 1 meter) can decrease (e.g., reduce) the velocity of the coolant exiting the conduit, which can inhibit (e.g., reduce, decrease, eliminate) the incidence of surface defects. Providing a convective air current traveling along the ribbon of molten material can decrease (e.g., reduce) the likelihood that a particle will impact a surface of the ribbon of molten material instead of and/or before undergoing a phase transition because the convective air current can redirect (e.g., carry away) such particles. Also, such a convective air current can direct (e.g., remove) the coolant after it undergoes a phase transition. Providing a coolant that undergoes a phase transition to a gas can decrease (e.g., reduce, eliminate) surface damage to the flowing ribbon.

Figure 9:
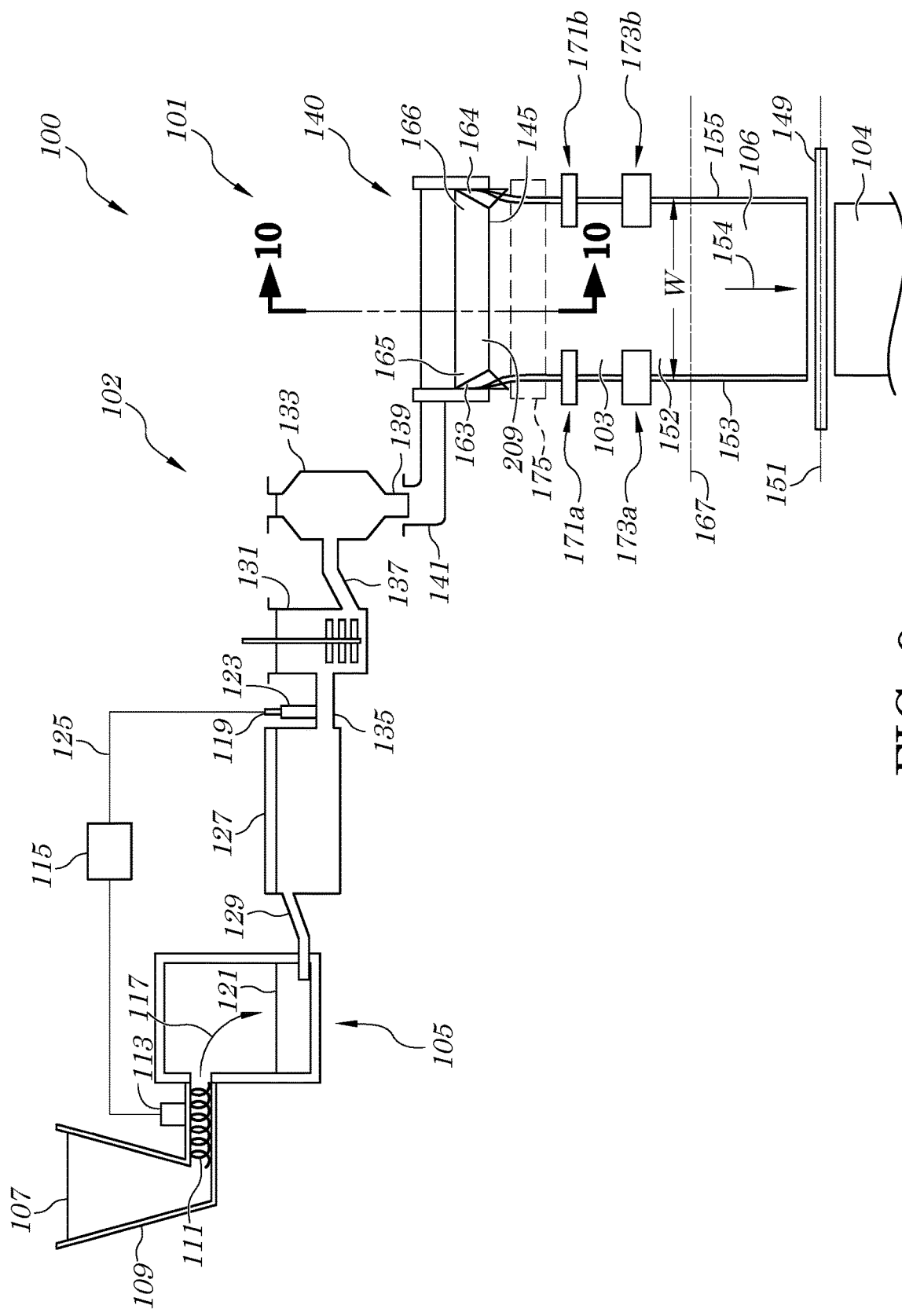
FIG. 9 schematically illustrates an example glass manufacturing apparatus in accordance with some embodiments of the disclosure.
Figure 10:
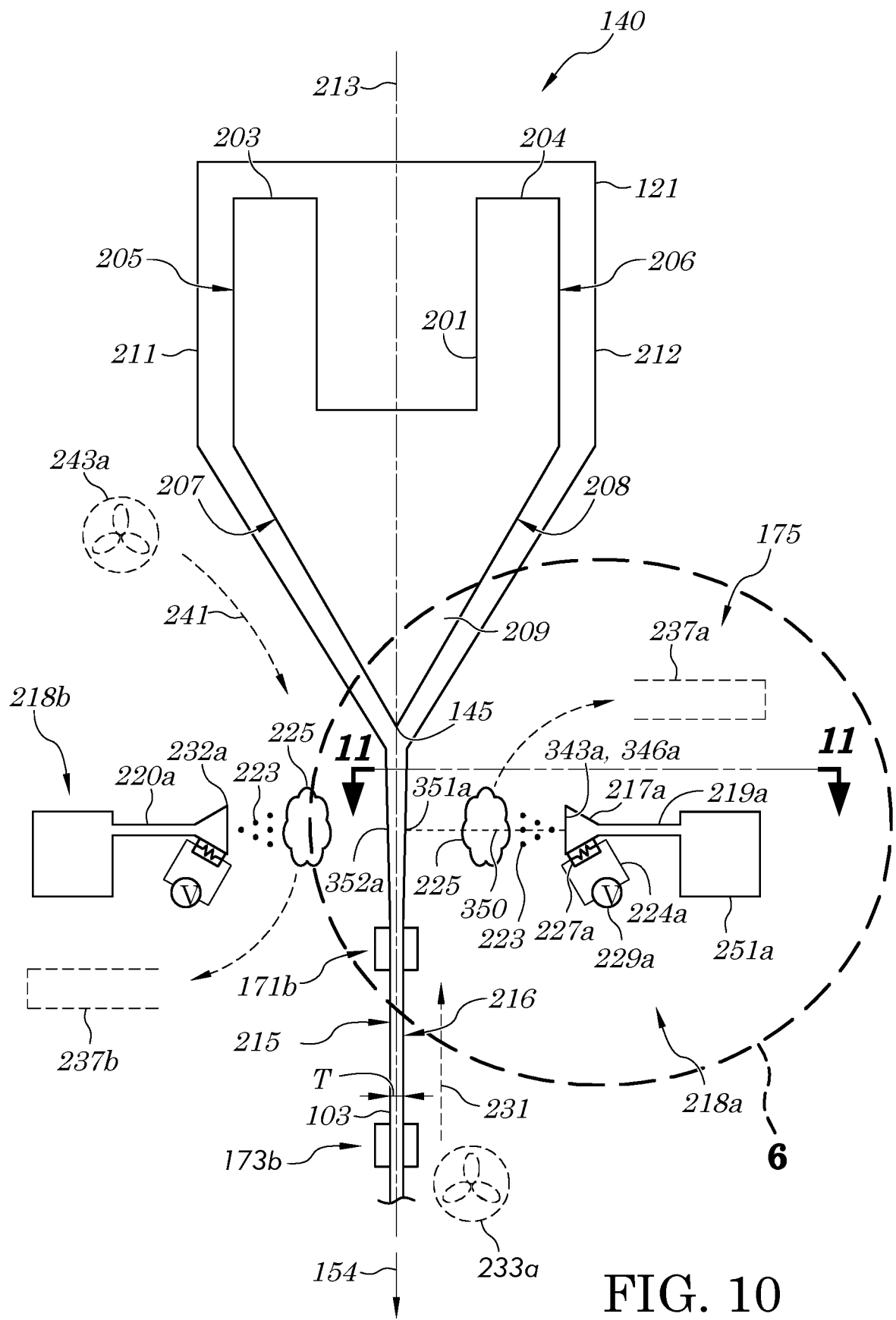
FIG. 10 shows a cross-sectional view of a glass manufacturing apparatus taken along lines 10-10 of FIG. 9 in accordance with some embodiments of the disclosure.

FIG. 10 shows a cross-sectional perspective view of the glass manufacturing apparatus 100 along line 10-10 of FIG. 9, according to various embodiments of the disclosure. As shown and described, the forming vessel 140 can include a trough 201 oriented to receive the molten material 121 from the inlet conduit 141. The forming vessel 140 can further include the forming wedge 209 including a pair of downwardly inclined converging surface portions 207, 208 extending between opposed ends 165, 166 (see FIG. 9) of the forming wedge 209. The pair of downwardly inclined converging surface portions 207, 208 of the forming wedge 209 can converge along the travel direction 154 to intersect along a bottom edge of the forming wedge 209 to define the root 145 of the forming vessel 140. A draw plane 213 of the glass manufacturing apparatus 100 can extend through the root 145 along the travel direction 154. In some embodiments, the ribbon of glass-forming material 103 can be drawn in the travel direction 154 along the draw plane 213. As shown, the draw plane 213 can bisect the forming wedge 209 through the root 145 although, in some embodiments, the draw plane 213 can extend at other orientations relative to the root 145.

Additionally, in some embodiments, the molten material 121 flows into the trough 201 of the forming vessel 140 and then overflows from the trough 201 by simultaneously flowing over weirs 203, 204 and downward over the outer surfaces 205, 206 of the weirs 203, 204. Respective streams 211, 212 of molten material 121 flow along corresponding downwardly inclined converging surface portions 207, 208 of the forming wedge 209 to be drawn off the root 145 of the forming vessel 140, where the streams 211, 212 of molten material 121 converge and fuse into the ribbon of glass-forming material 103. The ribbon of glass-forming material 103 can then be drawn off the root 145 in the draw plane 213 along the travel direction 154.

In some embodiments, although not shown, the forming vessel 140 can comprise a pipe oriented to receive the molten material 121 from the inlet conduit 141. In some embodiments, the pipe can comprise a slot through which molten material 121 can flow. For example, the slot can comprise an elongated slot that extends along an axis of the pipe at the top of the pipe. In some embodiments, a first wall can be attached to the pipe at a first peripheral location and a second wall can be attached to the pipe at a second peripheral location. The first wall and the second wall can comprise a pair of downwardly inclined converging surface portions. The first wall and the second wall can also at least partially define a hollow region within the forming vessel. In some embodiments, a pipe wall comprising the pipe, the first wall, and/or the second wall can comprise a thickness in a range from about 0.5 mm to about 10 mm, from about 0.5 mm to about 7 mm, from about 0.5 mm to about 3 mm, from about 1 mm to about 10 mm, from about 1 mm to about 7 mm, from about 3 mm to about 10 mm, from about 3 mm to about 7 mm, or any range or subrange therebetween. A thickness in the above range can result in overall reduced material costs compared to embodiments comprising thicker walls.

In some embodiments, the ribbon of glass-forming material 103 can cool to become a glass ribbon 106 below a glass transition line 167. In some embodiments, the glass separator 149 (see FIG. 9) can then separate the glass sheet 104 from the glass ribbon 106 along the separation path 151. As illustrated, in some embodiments, the separation path 151 can extend along the width "W" of the ribbon of glass-forming material 103 and/or the glass ribbon 106 between the first outer edge 153 and the second outer edge 155. Additionally, in some embodiments, the separation path 151 can extend perpendicular to the travel direction 154 of the ribbon of glass-forming material 103. Moreover, in some embodiments, the travel direction 154 can define a direction along which the ribbon of glass-forming material 103 can be fusion drawn from the forming vessel 140. In some embodiments, the ribbon of glass-forming material 103 can include a speed as it traverses along travel direction 154 of about 1 millimeters per second (mm/s) or more, about 10 mm/s or more, about 50 mm/s or more, about 100 mm/s or more, or about 500 mm/s or more, for example, in a range from about 1 mm/s to about 500 mm/s, from about 10 mm/s to about 500 mm/s, from about 50 mm/s to about 500 mm/s, from about 100 mm/s to about 500 mm/s, or any range or subrange therebetween.

Figure 11:
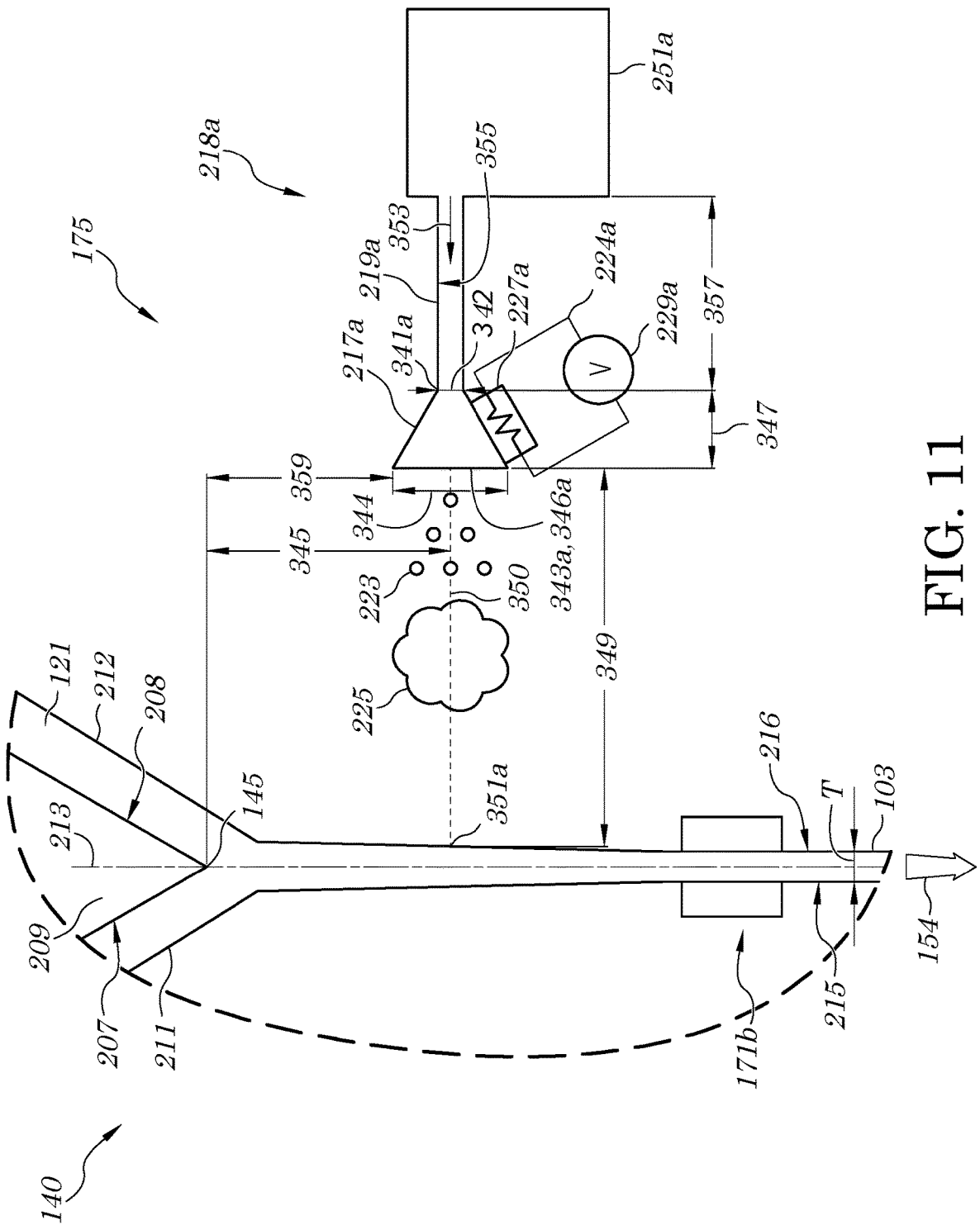
FIG. 11 is an enlarged view 6 of FIG. 10.

As shown in FIGS. 10-11, in some embodiments, the ribbon of glass-forming material 103 is drawn from the root 145 with a first major surface 215 of the ribbon of glass-forming material 103 and a second major surface 216 of the ribbon of glass-forming material 103 facing opposite directions and defining an average thickness "T" of the ribbon of glass-forming material 103. In some embodiments, the average thickness "T" of the central portion 152 of the ribbon of glass-forming material 103 and/or the glass ribbon 106 can be about 2 mm or less, about 1 mm or less, about 500 micrometers (μm) or less, about 300 μm or less, about 200 μm or less, or about 100 μm or less, although other thicknesses may be provided in further embodiments. For example, in some embodiments, the average thickness "T" of the ribbon of glass-forming material 103 and/or the glass ribbon 106 can be in a range from about 50 μm to about 750 μm, from about 100 μm to about 700 μm, from about 200 μm to about 600 μm, from about 300 μm to about 500 μm, from about 50 μm to about 500 μm, from about 50 μm to about 700 μm, from about 50 μm to about 600 μm, from about 50 μm to about 500 μm, from about 50 μm to about 400 μm, from about 50 μm to about 300 μm, from about 50 μm to about 200 μm, or from about 50 μm to about 100 μm, or any range or subrange therebetween.

Also, as shown in FIG. 9, the glass manufacturing apparatus 100 may comprise two pairs of edge rollers (e.g., a first pair of edge rollers 171a contacting the first outer edge 153 and a second pair of edge rollers 171b contacting the second outer edge 155). Additionally, the glass manufacturing apparatus 100 may comprise two pairs of pull rollers (e.g., a first pair of pull rollers 173a contacting a first edge portion comprising the first outer edge 153 and a second pair of pull rollers 173b contacting a second edge portion comprising the second outer edge 155). As used herein, "upstream" and "downstream" are terms used to describe relations based on the travel direction 154. For example, in some embodiments, the two pairs of edge rollers may be located downstream from the forming vessel 140. In some embodiments, the two pairs of pull rollers may be located downstream from the forming vessel 140 as shown in FIG. 9. In further embodiments, the two pairs of pull rollers may be located downstream from the two pairs of edge rollers 171a, 171b. For example, as shown, the two pairs of pull rollers 173a, 173b may be located downstream from the two pairs of edge rollers 171a, 171b and downstream from the forming vessel 140. Although not shown, in some embodiments, the two pairs of pull rollers 173a, 173b may be provided without edge rollers 171a, 171b. In some embodiments, the two pairs of pull rollers 173a, 173b can exert a pulling force in the travel direction 154 to obtain a predetermined thickness (e.g., average thickness "T") of the ribbon of glass-forming material 103, which can be within the thickness range discussed above.

Figure 12:
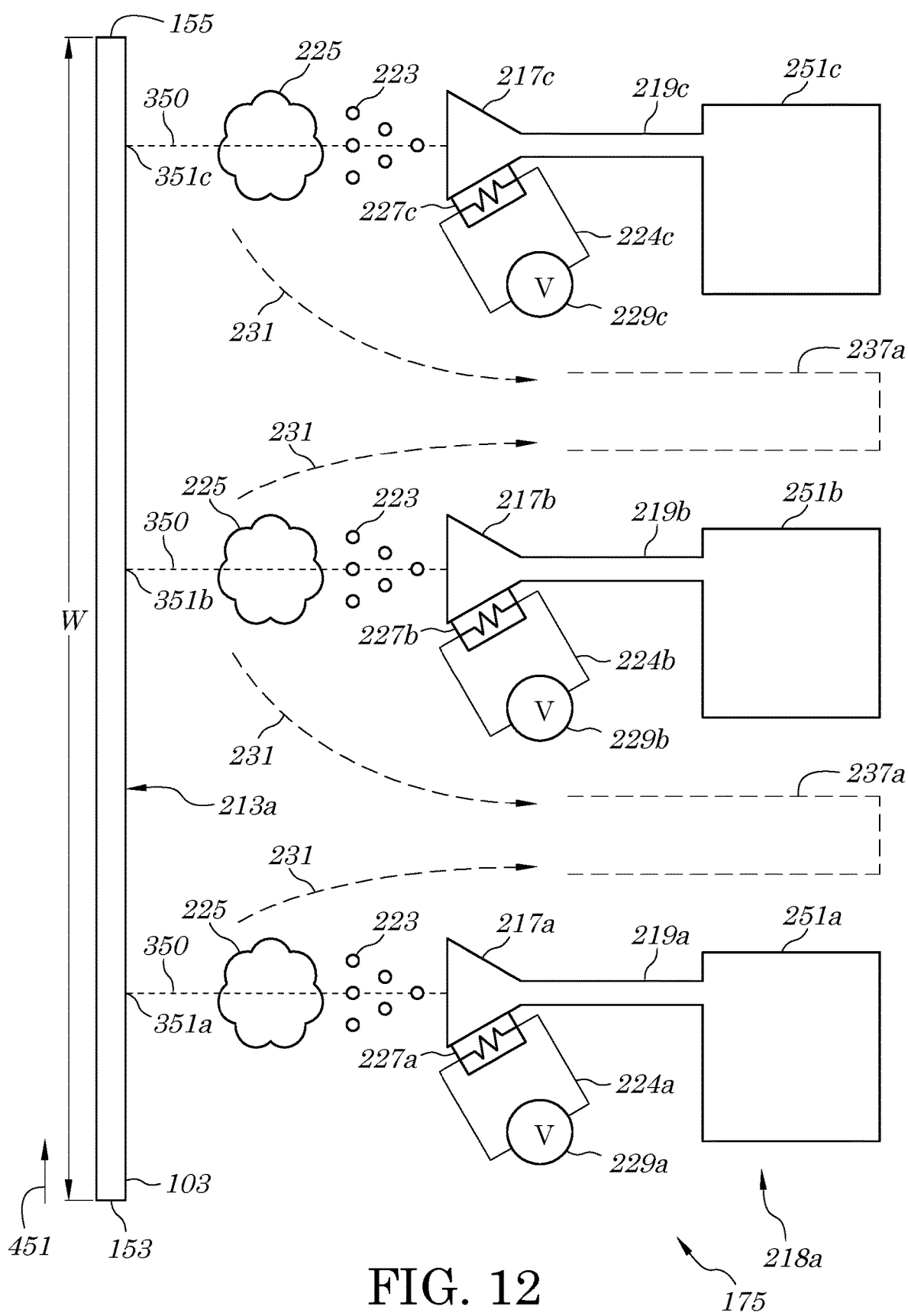
FIG. 12 illustrates another cross-sectional view of a glass manufacturing apparatus taken along lines 12-12 of FIG. 10 in accordance with some embodiments of the disclosure.

As shown schematically in FIGS. 9-12, the glass manufacturing apparatus 100 can comprise a cooling apparatus 175. For example, as shown in FIG. 10, the cooling apparatus 175 may comprise a first cooling apparatus 218a and/or a second cooling apparatus 218b. As shown, in some embodiments, the cooling apparatus 175 may comprise both the first cooling apparatus 218a and the second cooling apparatus 218b with the draw plane 213 positioned between the first cooling apparatus 218a the second cooling apparatus 218b. Although two cooling apparatuses 218a, 218b are shown, a single cooling apparatus or more than two cooling apparatuses may be provided in further embodiments. FIG. 3 is an enlarged view taken at view 3 of FIG. 10, and FIG. 12 is a cross-section taken along line 12-12 of FIG. 10. Both FIGS. 11-12 discuss features of the first cooling apparatus 218a. The first cooling apparatus 218a will be described more fully with the understanding that such description can also apply to one or more other cooling apparatus such as the second cooling apparatus 218b.

As shown in FIGS. 10-11, in some embodiments, the first cooling apparatus 218a can comprise a conduit 219a. As shown in FIG. 11, coolant flowing out of the conduit 219a can be directed by the conduit 219a in a flow direction 353. As shown, the conduit 219a can comprise a flow segment with a length 357 in the flow direction 353. In some embodiments, the length 357 of the flow segment of the conduit 219a can be about 0.01 meters (m) or more, about 0.1 m or more, about 0.5 m or more, about 10 m or less, about 5 m or less, or about 1 m or less. In some embodiments, the length 357 of the flow segment of the conduit 219a can be in a range from 0.01 m to about 10 m, from about 0.01 m to about 5 m, from about 0.01 m to about 1 m from 0.1 m to about 10 m, from about 0.1 m to about 5 m, from about 0.1 m to about 1 m, from about 0.5 m to about 10 m, from about 0.5 m to about 5 m, from about 0.5 m to about 1 m, or any range or subrange therebetween.

As shown, the flow segment of the conduit 219a can comprise a first width 342 in a direction substantially perpendicular to the flow direction 353. As used herein, the first width 342 is a maximum dimension of an inner surface 355 of the flow segment of the conduit 219a in a cross-section perpendicular to the flow direction 353. If the inner surface is a circular cylindrical surface, the maximum dimension would be the diameter of the circular cylindrical surface in a cross-section perpendicular to the flow direction. In some embodiments, as shown in FIG. 11, the first width 342 may be substantially the same along the length 357 of the flow segment of the conduit 219a. In some embodiments, although not shown, the first width 342 of the flow segment of the conduit 219a may increase (e.g., monotonically increase) along the length 357 of the flow segment of the conduit 219a. In other embodiments, although not shown, the first width 342 of the flow segment of the conduit 219a may decrease (e.g., monotonically decrease) along the length of the flow segment of the conduit 219a.

The flow segment of the conduit 219a comprises a maximum width. As used herein, a maximum width of the flow segment of the conduit 219a is the greatest value of the maximum dimension of the inner surface 355 of the flow segment of the conduit 219a in a cross-section perpendicular to the flow direction at every point along the length of the flow segment of the conduit 219a. In some embodiments, the first width 342 and/or the maximum width of the flow segment of the conduit 219a may be about 0.1 mm or more, 0.4 mm or more, about 1 mm or more, about 3 mm or more, about 10 mm or more, about 20 mm or more, about 50 mm or more, about 5 m or less, or about 1 m or less. In some embodiments, the first width 342 and/or the maximum width of the flow segment of the conduit 219a may be in a range from about 0.1 mm to about 5 m, 0.1 mm to about 1 m, from about 0.1 mm to about 5 m, 0.4 mm to about 1 m, from about 1 mm to about 5 m, from about 1 mm to about 1 m, from about 3 mm to about 5 m, from about 3 mm to about 1 m, from about 10 mm to about 5 m, from about 10 mm to about 1 m, from about 20 mm to about 5 m, from about 20 mm to about 1 m, from about 50 mm to about 5 m, from about 50 mm to about 1 m, or any range or subrange therebetween.

As shown in FIGS. 10-11, the conduit 219a of the first cooling apparatus 218a can be in fluid communication with a coolant source 251a. In some embodiments, the coolant source 251a can comprise a pump, a canister, a cartridge, a boiler, a compressor, and/or a pressure vessel. In some embodiments, the coolant source 251a may store the coolant in a gas phase. In some embodiments, the coolant source 251a may store the coolant in a liquid phase. In some embodiments, the coolant source 251a may store the coolant in a solid phase.

As shown in FIG. 11, the conduit 219a can comprise an outlet 343a. In some embodiments, as shown, the conduit 219a can comprise a nozzle 217a. In some embodiments, as shown, the nozzle 217a may be provided in addition to the flow segment wherein the nozzle 217a may be attached to an end of the flow segment. As shown, the nozzle 217a can comprise an outlet 346a comprising the outlet 343a of the conduit 219a. In further embodiments, as shown, the outlet 346a of the nozzle 217a can comprise a second width 344, and the nozzle 217a can comprise an inlet 341a comprising the first width 342 that is different from the second width 344. In even further embodiments, as shown, the second width 344 can be greater than the first width 342. In even further embodiments, the nozzle 217a can comprise an inlet 341a where the width (e.g., first width 342, cross-section) starts to increase along a direction toward the draw plane 213. In some embodiments, although not shown, the outlet of the nozzle may comprise substantially the same cross-section as another portion (e.g., the rest of) the conduit. In some embodiments, the nozzle 217a can comprise a length 347 in the flow direction 353. In some embodiments, the length 347 of the nozzle 217a may be less than the second width 344 of the outlet 346a. In some embodiments, the length 347 of the nozzle 217a can be within any of the ranges discussed above with regards to the length 357 of the conduit 219a.

In some embodiments, as shown in FIGS. 11, the nozzle 217a can comprise a diffuser. Without wishing to be bound by theory, a diffuser can decrease (e.g., reduce) the velocity of coolant in the nozzle 217a, which can inhibit (e.g., reduce, decrease, eliminate) the chance that the coolant contacts a surface of the ribbon of glass-forming material 103. Additionally, without wishing to be bound by theory, a diffuser can decrease the temperature of the coolant flowing through the diffuser when the coolant comprises a negative Joule-Thomson coefficient. In some embodiments, an atomizer may be positioned between the coolant source and the nozzle to generate particles (e.g., liquid droplets, solid particles).

In some embodiments, the nozzle 217a can comprise a boiling nozzle. Without wishing to be bound theory, a boiling nozzle may generate particles (e.g., liquid droplets, solid particles) using the kinetic energy (e.g., acceleration) of the coolant to separate a coolant stream into particles. In some embodiments, portions of a coolant stream may undergo a phase transformation to a gas (e.g., "boil") when accelerated by a boiling nozzle. In some embodiments, portions of a coolant stream may separate from one another based on the surface tension of the coolant as the coolant stream is thinned during acceleration in the nozzle.

In some embodiments, the nozzle 217a can comprise a shear nozzle. In further embodiments, a shear nozzle may generate particles (e.g., liquid droplets, solid particles) from a single coolant stream. In even further embodiments, the shear nozzle can induce a rotary fluid motion that can cause the coolant stream to separate into particles based on the shear forces introduce therein. In further embodiments, a shear nozzle can form particles (e.g., liquid droplets, solid particles) by combining a coolant and another fluid (e.g., gas). In even further embodiments, the coolant may be circumscribed by another fluid within the shear nozzle.

Without wishing to be bound by theory, shearing between the coolant and the another fluid can produce particles of coolant.

In some embodiments, the conduit 219a (e.g., nozzle 217a and/or flow segment of the conduit 219a) can comprise a thermally conductive material. In further embodiments, the conduit 219a (e.g., nozzle 217a and/or flow segment of the conduit 219a) can comprise a material comprising a thermal conductivity of about 20 Watts per meter Kelvin (W/mK) or more, about 50 W/mK or more, about 100 W/mK or more, about 1000 W/mK or less, about 500 W/mK or less, or about 300 W/mK or less. In further embodiments, the conduit 219a (e.g., nozzle 217a and/or flow segment of the conduit 219a) can comprise a material comprising a thermal conductivity in a range from about 20 W/mK to about 1000 W/mK, from about 20 W/mK to about 500 W/mK, from about 20 W/mK to about 200 W/mK, from about 50 W/mK to about 1000 W/mK, from about 50 W/mK to about 500 W/mK, from about 50 W/mK to about 200 W/mK, from about 100 W/mK to about 1000 W/mK, from about 100 W/mK to about 500 W/mK, from about 100 W/mK to about 200 W/mK, or any range or subrange therebetween. For example, silicon nitride comprises a thermal conductivity of about 20 W/mK, bronze comprises a thermal conductivity of about 26 W/mK, platinum comprises a thermal conductivity of about 55 W/mK, silicon carbide comprises a thermal conductivity of 60 W/mK, and gold comprises a thermal conductivity of about 310 W/mK. Providing a material that is thermally conductive (e.g., about 20 W/mK or more) can inhibit (e.g., reduce, prevent, eliminate) thermal fluctuation and/or thermal gradients along the length 357 or 347 of the flow segment of the conduit 219a and/or nozzle 217a of the conduit 219a respectively. In further embodiments, this can inhibit (e.g., reduce, prevent, eliminate) agglomeration of coolant, which can lead to larger particle sizes that might otherwise impact (e.g., mar) the surface of the ribbon of glass-forming material 103. In some embodiments, the conduit 219a and/or nozzle 217a can comprise one or more of a thermally conductive ceramic or a metal. Exemplary embodiments of thermally conductive ceramics can comprise one or more of silicon nitride, alumina, or silicon carbide. Exemplary embodiments of thermally conductive metals can comprise copper alloys (e.g., bronze, brass), iron, steel alloys, platinum, platinum alloys, nickel, tin, copper, tungsten, molybdenum, aluminum, gold, and/or silver. In some embodiments, the conduit 219a and/or nozzle 217a can comprise an electrically insulating material (e.g., comprising a resistivity of about 10,000 Ω/m or more, and/or comprising a conductivity of about 0.0001 S/m or less).

In some embodiments, the conduit 219a (e.g., nozzle 217a and/or flow segment of the conduit 219a) can comprise a polygonal (e.g., triangular, quadrilateral, pentagonal, hexagonal, etc.) cross-section taken perpendicular to the flow direction 353. In some embodiments, the conduit 219a (e.g., nozzle 217a and/or flow segment of the conduit 219a) can comprise a curvilinear (e.g., elliptical, circular) cross-section taken perpendicular to the flow direction 353. In some embodiments, the conduit 219a (e.g., nozzle 217a and/or flow segment of the conduit 219a) can comprise a cross-section taken perpendicular to the flow direction 353 comprising a combination of polygonal and curvilinear shapes.

In some embodiments, as shown in FIGS. 10-12, the first cooling apparatus 218a can comprise a heater (e.g., electric heater 227a). In further embodiments, as shown, the heater (e.g., electric heater 227a) can be configured to heat the first cooling apparatus 218a adjacent the outlet 343a, 346a. In some embodiments, the heater can be attached to conduit 219a or spaced from the conduit 219a while heating the conduit adjacent the outlet 343a, 346a. In further embodiments, as shown, the heater (e.g., electric heater 227a) can heat the nozzle 217a of the first cooling apparatus 218a. In some embodiments, the heater may be attached to the nozzle 217a to heat the nozzle although the heater may be spaced from the nozzle 217a in further embodiments. In some embodiments, the heater (e.g., electric heater 227a) can circumscribe the nozzle 217a and/or conduit 219a. Providing the heater (e.g., electric heater 227a) can maintain the nozzle 217a and/or the flow segment of the conduit 219a at a predetermined temperature, which can inhibit (e.g., reduce, prevent, eliminate) agglomeration of coolant, which can lead to larger particle sizes that might otherwise impact the surface of the ribbon of glass-forming material 103.

In some embodiments, although not shown, the heater may comprise a heating conduit through which a heated fluid (e.g., air, steam, super critical carbon dioxide) circulates. In some embodiments, as shown in FIGS. 10-12, the heater may comprise an electric heater 227a. The electric heater 227a may comprise a metal or a refractory material (e.g., ceramic). Exemplary embodiments of metals can include chromium, molybdenum, tungsten, platinum, platinum, rhodium, iridium, osmium, palladium, ruthenium, gold, and combinations (e.g., alloys) thereof. Additional exemplary embodiments of metals (e.g., alloys) can include nickel-chromium alloys (e.g., nichrome), iron-chromium-aluminum alloys, or platinum alloys as described above. Exemplary embodiments of ceramics can include silicon carbide, chromium disilicide ($CrSi_2$), molybdenum disilicide ($MoSi_2$), tungsten disilicide ($WSi_2$), alumina, barium titanate, lead titanate, lanthanum chromite, zirconia, yttrium oxide, or combinations thereof. In some embodiments, the electric heater 227a can comprise platinum or a platinum alloy. In some embodiments, the electric heater 227a can comprise silicon carbide. In some embodiments, the electric heater 227a can comprise molybdenum disilicide.

As shown in FIGS. 11-12, the heater (e.g., electric heater 227a) can be connected to a power source 229a via leads 224a. As used herein, the power source 229a may be any device capable of creating an electric potential difference. In some embodiments, the power source 229a may comprise a battery, a capacitor, a fuel cell, or a generator. In some embodiments, the power source 229a may comprise a commercially available power supply unit, for example, a programmable power supply unit, an uninterruptible power supply unit, a switched-mode power supply unit, and/or a linear regulator power supply unit.

As shown in FIGS. 10-12, the outlet 343a of the conduit 219a and/or the outlet 346a of the nozzle 217a can face a surface (e.g., first major surface 213a) of the ribbon of glass-forming material 103. In some embodiments, a minimum distance 349 between the outlet 343a or 346a and the ribbon of glass-forming material 103 (e.g., first major surface 213a) can be about 100 mm or more, about 200 mm or more, about 500 mm or more, about 1 m or less, about 800 mm or less, or about 500 mm or less. In some embodiments, a minimum distance 349 between the outlet 343a or 346a and the ribbon of glass-forming material 103 (e.g., first major surface 213a) can be in a range from about 100 mm to about 1 m, from about 200 mm to about 1 m, from about 500 mm to about 1 m, from about 100 mm to about 800 mm, from about 200 mm to about 800 mm, from about 500 mm to about 800 mm, from about 100 mm to about 500 mm, from about 200 mm to about 500 mm, or any range or subrange therebetween.

In some embodiments, the coolant may undergo a phase change between the outlet 343a of the conduit 219a and/or the outlet 346a of the nozzle 217a and the ribbon of glass-forming material 103. In further embodiments, substantially all of the coolant may undergo a phase after flowing from the outlet 343a of the conduit 219a and/or the outlet 346a of the nozzle 217a. In further embodiments, substantially all of the coolant may undergo a phase change within a distance from the ribbon of glass-forming material 103 that can be within any of the ranges discussed above for minimum distance 349. In further embodiments, substantially none of the coolant impacts the flowing ribbon of molten material.

In some embodiments, as shown in FIGS. 10-12, the outlet 343a of the conduit 219a and/or the outlet 346a of the nozzle 217a can be positioned below the forming vessel 140 such that the nozzle 217a is positioned downstream in the travel direction 154 relative to the forming vessel 140. The outlet 343a of the conduit 219a and/or the outlet 346a of the nozzle 217a is designed to direct coolant from the outlet in the flow direction 353 to a target location 351a. Throughout the disclosure, the target location is defined as a location impinged by a central axis 350 of the coolant flow as it flows from the outlet. Referring to FIG. 11, the target location 351a on the ribbon of glass-forming material 103 is defined as a location impinged by the central axis 350 of the coolant flow as it flows from the outlet 343a or 346a. A length of the central axis 350 is defined as the minimum distance between the outlet 343a, 346a and the ribbon of glass-forming material 103. In some embodiments, a minimum distance 349 between the outlet 343a or 346a and the target location 351a can comprise the length of the central axis 310 and can be about 1 mm or more, about 10 mm, or more, about 100 mm or more, about 1 m or less, about 500 mm or less, or about 200 mm or less. In some embodiments, the minimum distance 349 can be in a range from about 1 mm to about 1 m, from about 10 mm to about 1 m, from about 100 mm to about 1 m, from about 1 mm to about 500 mm, from about 10 mm to about 500 mm, from about 100 mm to about 500 mm, from about 1 mm to about 200 mm, from about 10 mm to about 200 mm, from about 100 mm to about 200 mm, or any range or subrange therebetween.

In some embodiments, as shown, the outlet 343a of the conduit 219a and/or the outlet 346a of the nozzle 217a can be positioned upstream in the travel direction 154 relative to the pairs of pull rollers 173a, 173b. As further illustrated, the target location 351a can be positioned upstream in the travel direction 154 relative to the pairs of pull rollers 173a, 173b.

In further embodiments, as shown, the outlet 343a of the conduit 219a and/or the outlet 346a of the nozzle 217a can be positioned between the forming vessel 140 and the pairs of pull rollers 173a, 173b. That is, the outlet 343a of the conduit 219a and/or the outlet 346a of the nozzle 217a can be positioned downstream in the travel direction 154 relative to the forming vessel 140 and upstream in the travel direction 154 relative to the pairs of pull rollers 173a, 173b. In further embodiments, as shown, the target location 351a can be positioned between the forming vessel 140 and the pairs of pull rollers 173a, 173b. That is, the target location 351a can be positioned downstream in the travel direction 154 relative to the forming vessel 140 and upstream in the travel direction 154 relative to the pairs of pull rollers 173a, 173b.

In further embodiments, as shown, the outlet 343a of the conduit 219a and/or the outlet 346a of the nozzle 217a can be positioned above the pairs of edge rollers 171a, 171b. That is, the outlet 343a of the conduit 219a and/or the outlet 346a of the nozzle 217a can be positioned upstream in the travel direction 154 relative to the pairs of edge rollers 171a, 171b. In further embodiments, the target location 351a can be positioned above the pairs of edge rollers 171a, 171b. That is, the target location 351a can be positioned upstream in the travel direction 154 relative to the pairs of edge rollers 171a, 171b.

In some embodiments, the first cooling apparatus can comprise a plurality of conduits although a single conduit may be provided in further embodiments. If a plurality of conduits are provided, as shown in FIG. 12, the plurality of conduits 219a-c may comprise the illustrated three conduits although two conduits or more than three conduits may be provided in further embodiments. In further embodiments, as shown, each conduit 219a-c can be connected to a respective coolant source 251a-c. In further embodiments, although not shown, one or more conduits may be connected to the same fluid source. In further embodiments, one or more of the conduits 219a-c may comprise a nozzle. In even further embodiments, as shown, each conduit 219a-c can comprise a respective nozzle 217a-c. In further embodiments, one or more of the conduits 219a-c may be associated with a heater (e.g., electric heaters 227a-c). In even further embodiments, as shown, each conduit 219a-c can be associated with a respective heater (e.g., electric heaters 227a-c). In still further embodiments, as shown, each electric heater 227a-c may be provided in an electric circuit with a corresponding power source 229a-c and leads 224a-c. In still further embodiments, although not shown, a plurality of the electric heaters 227a-c may be powered by a common power source.

As shown in FIG. 10, the plurality of conduits, if provided, may comprise a first set of conduits (e.g., conduits 219a-c, see FIG. 12). The first set of conduits 219a-c can provide a plurality of target locations 351a-c with each target location of the plurality of target locations associated with a corresponding conduit of the first set of conduits. As further illustrated in FIG. 10, the plurality of conduits can also comprise a second set of conduits (e.g., second conduits 220a) that, in some embodiments, may mirror the first set of conduits 219a-c illustrated in FIG. 12. The second set of conduits 220a can provide a second set of target locations (e.g., 352a in FIG. 10) that, in some embodiments, may mirror the first set of target locations 351a-c illustrated in FIG. 12. Each target location of the second set of target locations (e.g., 352a in FIG. 10) can be associated with a corresponding conduit of the second set of conduits (e.g., conduits 220a). In some embodiments, as shown, the first set (e.g., conduits 219a-c) and corresponding first set of target locations 351a-c can be arranged in a first row. In further embodiments, as shown, the first row may extend along a direction 451 of the width W of the ribbon of glass-forming material 103. In further embodiments, although not shown, the first row may extend along the travel direction 154 of the ribbon of glass-forming material 103 or in a matrix of rows and columns of conduits and corresponding target locations can extend in the direction 451 of the width and in the travel direction 154. In some embodiments, as shown, the outlets of the first set (e.g., first cooling apparatus 218a) of the plurality of conduits can face a first surface (e.g., first major surface 213a) of the ribbon of glass-forming material 103. In further embodiments, as shown in FIG. 10, the outlets (e.g., outlet 232a) of the second set (e.g., second cooling apparatus 218b) of the plurality of conduits can face a second surface (e.g., second major surface 213b) of the ribbon of glass-forming material 103 opposite the first surface (e.g., first major surface 213a) oft the ribbon of glass-forming material 103 the ribbon of glass-forming material 103. In some embodiments, the second set of conduits (e.g., conduits 220a) and corresponding second set of target locations (e.g., target locations 352a) can be arranged in a second row or matrix similar or identical to the row or matrix of conduits 219a-c and target locations 351a-c illustrated in FIG. 12 and discussed above.

As shown in FIGS. 10-12, the first cooling apparatus 218a can be configured to flow a coolant from the outlet 343a of the conduit 219a (e.g., the outlet 346a of the nozzle 217a). In some embodiments, as shown, the coolant can flow from the outlet 343a or 346a as coolant particles 223. In some embodiments, the coolant can flow from the outlet 343a or 346a as a solid particle. In further embodiments, the coolant flowing from the outlet 343a or 346a can comprise solid particles with a median particle size of about 5 µm or more, about 10 µm or more, about 20 µm or less, or about 10 µm or less. In further embodiments, the coolant flowing from the outlet 343a or 346a can comprise solid particles with a median particle size in a range from about 5 µm to about 20 µm, from about 5 µm to about 10 µm, from about 10 µm to about 20 µm, or any range or subrange therebetween. In some embodiments, the coolant flowing from the outlet 343a or 346a can comprise solid particles and about 90% of the solid particles can comprise a size in a range from about 1 µm to about 100 µm, from about 5 µm to about 100 µm, from about 10 µm to about 100 µm, from about 1 µm to about 75 µm, from about 5 µm to about 75 µm, from about 10 µm to about 75 µm, from about 1 µm to about 50 µm, from about 5 µm to about 50 µm, from about 10 µm to about 50 µm, from about 1 µm to about 20 µm, from about 5 µm to about 20 µm, from about 10 µm to about 20 µm, or any range or subrange therebetween.

In some embodiments, the coolant can flow from the outlet 343a or 346a as a liquid. In further embodiments, the coolant may flow from the outlet 303a or 346a as a liquid particle (e.g., atomized liquid). In further embodiments, the coolant flowing from the outlet 343a or 346a can comprise liquid particles with a median particle size of about 5 µm or more, about 10 µm or more, about 20 µm or less, or about 10 µm or less. In further embodiments, the coolant flowing from the outlet 343a or 346a can comprise liquid particles with a median particle size in a range from about 5 µm to about 20 µm, from about 5 µm to about 10 µm, from about 10 µm to about 20 µm, or any range or subrange therebetween. In some embodiments, the coolant flowing from the outlet 343a or 346a can comprise liquid particles and about 90% of the liquid particles can comprise a size in a range from about 1 µm to about 100 µm, from about 5 µm to about 100 µm, from about 10 µm to about 100 µm, from about 1 µm to about 75 µm, from about 5 µm to about 75 µm, from about 10 µm to about 75 µm, from about 1 µm to about 50 µm, from about 5 µm to about 50 µm, from about 10 µm to about 50 µm, from about 1 µm to about 20 µm, from about 5 µm to about 20 µm, from about 10 µm to about 20 µm, or any range or subrange therebetween.

Providing coolant particles 223 with a small median particle size (e.g., from about 5 µm to about 20 µm) can decrease (e.g., reduce, prevent, eliminate) the incidence of surface damage because it decreases the likelihood that a particle will impact a surface of the ribbon of molten material instead of and/or before undergoing a phase transition while still increasing the cooling rate and/or cooling capacity. Further, providing a coolant that undergoes a phase change to a gas can decrease (e.g., reduce, eliminate) the change of surface damage (e.g., increased roughness) to the flowing ribbon. Likewise, providing a coolant comprising a controlled, narrow particle size distribution (e.g., about 90% of the particles comprise a size in a range from about 1 micrometer to about 100 micrometers) can decrease (e.g., reduce, eliminate) the likelihood that a particle will impact a surface of the ribbon of molten material instead of and/or before undergoing a phase transition while still increasing the cooling rate and/or cooling capacity. Either of the above particle size relationships can be enabled by heating the conduit (e.g., outlet of the conduit, nozzle) because such heating can inhibit (e.g., reduce, prevent, eliminate) agglomeration of particles.

In some embodiments, the coolant can be configured to undergo a phase transition, such as to a gas 225, after it flows from the outlet 343a of the conduit 219a and/or the outlet of the nozzle 217a, as shown in FIGS. 10-12. In some embodiments, the coolant may undergo a phase transformation from a solid to a gas (e.g., sublimation, melting followed by vaporization). In some embodiments, the coolant may undergo a phase change from a liquid to a gas (e.g., vaporization). In some embodiments, the coolant can absorb a thermal energy from the phase change of about 0.1 kilojoules per kilogram (kj/kg) or more, about 1 kj/kg or more, about 10 kj/kg or more, about 100 kj/kg or more, about 500 kj/kg or more, about 5,000 kj/kg or less, or about 600 kj/kg or less. In some embodiments, the coolant can absorb a thermal energy from the phase change in a range from about 0.1 kj/kg to about 5,000 kj/kg, from about 1 kj/kg to about 5,000 kj/kg, from about 10 kj/kg to about 5,000 kj/kg, from about 100 kj/kg to about 5,000 kj/kg, from about 500 kj/kg to about 5,000 kj/kg, from about 0.1 kj/kg to about 600 kj/kg, from about 1 kj/kg to about 600 kj/kg, from about 10 kj/kg to about 600 kj/kg, from about 100 kj/kg to about 600 kj/kg, from about 500 kj/kg to about 600 kj/kg, or any range or subrange therebetween. For example, nitrogen comprises a latent heat of vaporization about 0.2 kj/kg, carbon dioxide comprises a latent heat of sublimation of about 570 kj/kg, and water comprises a latent heat of vaporization of about 2,300 kj/kg.

The coolant can absorb thermal energy thereby cooling the ribbon of glass-forming material 103. The coolant can absorb thermal energy as it is heated from an initial temperature when it flows from the outlet 343a or 346a to a second temperature when it undergoes a phase transformation. The coolant can absorb thermal energy when it undergoes a phase transformation, for example, to a gas 225. The coolant can absorb thermal energy when it is heated from a second temperature when it underwent the phase transformation to a final temperature. Without wishing to be bound by theory, the amount of thermal energy absorbed by a material when it is heated from a first temperature to a second temperature without undergoing a phase change is proportional to the heat capacity of the material. In some embodiments, the coolant can comprise a heat capacity at a temperature from about 300 Kelvin (K) to about 500 K of about 1 kilojoules per kilogram Kelvin (kj/kgK) or more, about 2 kj/kgK or more, about 3 kj/kgK or more, about 5 kj/kgK or less, or about 4 kj/kgK or less. In some embodiments, the coolant can comprise a heat capacity at a temperature from about 300 K to about 500 K in a range from about 1 kj/kgK to about 5 kj/kgK, from about 2 kj/kgK to about 5 kj/kgK, from about 3 kj/kgK to about 5 kj/kgK, from about 1 kj/kgK to about 4 kj/kgK, 2 kj/kgK to about 4 kj/kgK, from about 3 kj/kgK to about 4 kj/kgK, or any range or subrange therebetween. For example, nitrogen comprises a heat capacity of about 1 kj/kgK, carbon dioxide comprises a heat capacity of about 1 kj/kgK, and water comprises a heat capacity of about 4 kj/kgK.

In some embodiments, the coolant can comprise one or more of water, nitrogen, and carbon dioxide. In some embodiments, the coolant can be a compound with hydrogen bonding. Without wishing to be bound by theory, compounds with hydrogen bonding in a solid and/or liquid can be associated with higher latent heat of vaporization, fusion, and/or sublimation than similar compounds without hydrogen bonding. In further embodiments, the coolant can comprise ammonia, water, or an organic alcohol (e.g., methanol, ethanol, propanol, butanol, pentanol, hexanol). In some embodiments, the coolant can comprise an alkane (e.g., methane, ethane, propane, butane, pentane, hexane).

In some embodiments, the coolant can be flowed from the conduit without a propellant. In some embodiments, the coolant can be flowed from the conduit with a propellant. In further embodiments, the propellant can comprise a carrier gas. In even further embodiments, the carrier gas may comprise the same material as the coolant in the gas phase. In even further embodiments, the carrier gas can comprise one or more of air, nitrogen, helium, argon, xenon, carbon dioxide, or oxygen.

In some embodiments, as shown in FIG. 10, a convective air current 231, 241 may be generated from a fan 233a, 243a or other device designed to drive an air current. In further embodiments, as shown, a portion of the convective air current 231, 241 can travel along the ribbon of glass-forming material 103. In even further embodiments, as shown, a portion of the convective air current 231 can travel along the ribbon of glass-forming material 103 in a direction opposite a travel direction 154 of the ribbon of glass-forming material 103. In even further embodiments, as shown, the convective air current 241 can travel along the ribbon of glass-forming material 103 in the travel direction 154 of the ribbon of glass-forming material 103. In even further embodiments, although not shown, the convective air current can travel across to the travel direction 154 of the ribbon of glass-forming material 103 (e.g., in the direction 451 or directional component of the width "W"). As shown, the portion of the convective air current 231 associated with the first major surface 213a can travel in an opposite direction than the portion of the convective air current 241 associated with the second major surface 213b. Although not shown, the portions of the convective air currents 231, 241 traveling along the ribbon of glass-forming material 103 can travel in the same direction. For example, the fans 233a, 243a or other device can provide that the portions of the convective air currents 231, 241 traveling along the ribbon of glass-forming material 103 both flow in the travel direction 154 or both flow in a direction opposite the travel direction 154.

In some embodiments, as shown in FIGS. 10 and 12, the convective air current 231, 241, in addition or alternative to the fans 233a, 243a, can be promoted by one or more vacuum sources 237a, 237b. The vacuum sources 237a, 237b as well as the fans 233a, 243a can help remove the gas 225 from the vicinity of the ribbon of glass-forming material 103.

The glass manufacturing apparatus 100 of the embodiments of the disclosure can be used in methods of manufacturing glass. Methods can comprise flowing a ribbon of glass-forming material 103 in a travel direction 154, as shown in FIGS. 10-11. As shown, methods can comprise flowing a coolant from an outlet 343a of a conduit 219a in a flow direction 353 toward a target location 351a of the ribbon of glass-forming material 103. The coolant can comprise any of the materials described above for the coolant, for example, one or more of water, nitrogen, or carbon dioxide. In some embodiments, as described above and shown in FIGS. 10-12 the outlet 343a of the conduit 219a can comprise a nozzle 217a. In further embodiments, the nozzle 217a can comprise a diffuser. In further embodiments, the nozzle 217a can comprise a boiling nozzle. In further embodiments, the nozzle 217a can comprise a shear nozzle. In some embodiments, a minimum distance 349 between the outlet 343a of the conduit 219a and the ribbon of glass-forming material 103 can be within the ranges discussed above, for example, in a range from about 100 mm to about 1 m. As described above, the coolant flowing from the outlet 343a of the conduit 219a can comprise a liquid and/or a solid. In some embodiments, the coolant flowing from the outlet 343a of the conduit 219a can comprise coolant particles 223. In further embodiments, the particles of coolant can comprise a median particle size within the ranges discussed above, for example, in a range from about 5 μm to about 20 μm. In even further embodiments, the particles can comprise solid particles of coolant. In further embodiments, about 90% of the particles can comprise a size within the ranges discussed above, for example, from about 1 μm to about 100 μm. In even further embodiments, the particles can comprise solid particles of coolant. Methods can also comprise heating the conduit 219a, for example with a heater (e.g., electric heater 227a), as discussed above.

In some embodiments, as shown in FIGS. 10-11, a minimum distance 359 between the outlet 343a of the conduit 219a and the forming vessel 140 can be about 1 mm or more, about 10 mm, or more, about 100 mm or more, about 1 m or less, about 500 mm or less, or about 200 mm or less. In some embodiments, a minimum distance 359 between the outlet 343a of the conduit 219a and the forming vessel 140 can be in a range from about 1 mm to about 1 m, from about 10 mm to about 1 m, from about 100 mm to about 1 m, from about 1 mm to about 500 mm, from about 10 mm to about 500 mm, from about 100 mm to about 500 mm, from about 1 mm to about 200 mm, from about 10 mm to about 200 mm, from about 100 mm to about 200 mm, or any range or subrange therebetween.

In some embodiments, coolant can flow from the outlet 343a of the conduit 219a at a mass flow rate of about 1 gram per minute (g/min) or more, about 10 g/min or more, about 50 g/min or more, about 200 g/min or less, about 100 g/min or less, or about 50 g/min or less. In some embodiments, the coolant can flow from the outlet 343a of the conduit 219a at a mass flow rate in a range from about 1 g/min to about 200 g/min, from about 1 g/min to about 100 g/min, from about 1 g/min to about 50 g/min, from about 10 g/min to about 200 g/min, from about 10 g/min to about 100 g/min, from about 10 g/min to about 50 g/min, from about 50 g/min to about 200 g/min, from about 50 g/min to about 100 g/min, or any range or subrange therebetween. Providing a mass flow rate of the coolant within the above ranges can enable increased cooling rates and/or cooling capacity without damaging the surface(s) of the ribbon of molten material being cooled.

In some embodiments, as discussed above and shown in FIGS. 10-11, the target location 351a can be positioned below the forming vessel 140. In further embodiments, a minimum distance 345 between the forming vessel 140 and the target location 351a can be within any of the ranges discussed above with regards to minimum distance 359, for example, about 1 meter (m) or less. In some embodiments, as discussed above and shown in FIG. 10, the method can further comprise pulling the molten material 121 (e.g., ribbon of glass-forming material 103) with pairs of pull rollers 173a, 173b. In further embodiments, as shown, the target location 351a can be positioned between the forming vessel 140 and the pairs of pull rollers 173a, 173b.

Methods can also comprise changing a phase of the coolant while the coolant is flowing toward the target location 351a wherein the change in phase cools the target location 351a. In some embodiments, changing a phase of the coolant can comprise changing the phase of the coolant to a gas 225 while the coolant is flowing toward the target location 351a wherein the change in phase cools the target location 351a. In some embodiments, a substantial portion (e.g., substantially the entire) quantity of coolant emitted from the outlet of the conduit changes phase before reaching the ribbon of glass-forming material 103. Changing phase such that a substantial portion of the coolant fails to contact the ribbon of glass-forming material 103 can decrease (e.g., reduce) an impact force that the coolant may impose on the ribbon that might otherwise occur without the phase change. As such, the change in phase of the coolant can provide the beneficial effect of providing cooling of the target location without damaging the ribbon that might otherwise occur if the coolant were to impact the ribbon prior to the phase change to the gas. In some embodiments, the coolant (e.g., the change in phase of the coolant) can cool portions of the flowing ribbon adjacent to the target location in addition to cooling the portion of the flowing ribbon comprising the target location. In some embodiments, as shown in FIGS. 10 and 12, methods can further comprise moving the gas 225 with a convective air current 231, 241 travelling along the ribbon of glass-forming material 103.

Methods can further comprise determining a deviation of a thickness (e.g., average thickness "T" of a portion (e.g., target location 351a) of the ribbon of glass-forming material 103 from a predefined thickness. In some embodiments, the thickness of the portion may be greater than the predetermined thickness. Methods can further comprise cooling the portion (e.g., target location 351a) of the ribbon of glass-forming material 103 by flowing coolant from an outlet 343a of a conduit 219a toward the portion (e.g., target location 351a). In some embodiments, a phase change of coolant can cool the portion (e.g., target location 351a). In further embodiments, a phase change of coolant to a gas can cool the portion (e.g., target location 351a). In some embodiments, the cooling can decrease (e.g., reduce, eliminate) the deviation of the thickness of the portion (e.g., target location 351a) of the ribbon of glass-forming material 103 by increasing a viscosity of the portion (e.g., target location 351a) of the ribbon of glass-forming material 103.

EXAMPLES

Various embodiments will be further clarified by the following examples. The overall heat flux as a function of mass flow rate is reported in FIG. 13. The thermal gradient as a function of mass flow rate is reported in FIG. 14. The data reported in FIGS. 13-14 were obtained by flowing solid carbon dioxide from a nozzle comprising a 1 mm width at the outlet towards a first surface of a 110 mm by 56 mm by 6 mm sheet of stainless steel within a chamber maintained at 1000° C. Temperatures were recorded using thermocouples with a minimum spacing of 0.7 mm.

Figure 13:
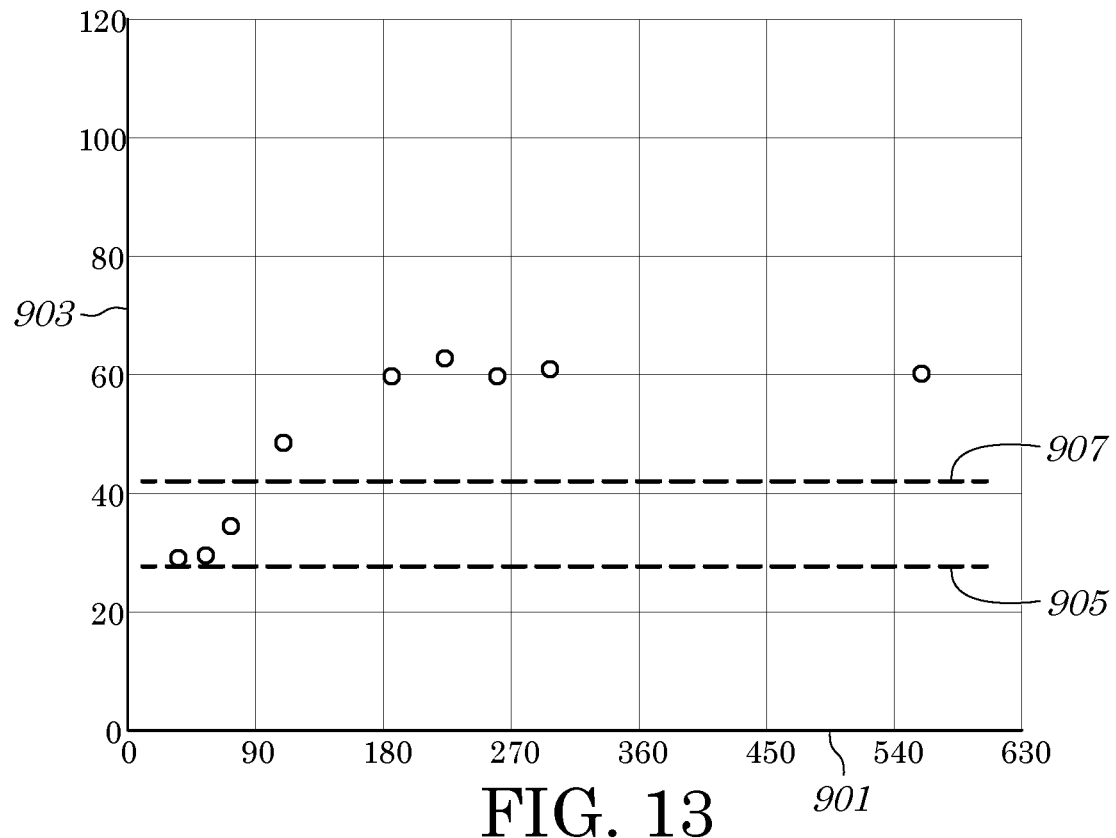
FIG. 13 is a plot illustrating overall heat flux as a function of mass flow rate.

As used with regards to FIG. 13, overall heat flux is the change in temperature per time unit multiplied by the mass of the sheet and the heat capacity of the sheet divided by the surface area of the sheet. The horizontal axis 901 (e.g., x-axis) is a mass flow rate of carbon dioxide in grams per minute (g/min). The vertical axis 903 (e.g., y-axis) is an overall heat flux in kilowatts per meter$^2$ (kW/m$^2$). The first horizontal line 905 represents the maximum heat flux obtainable using radiative cooling and/or convection currents of gas along the surface of the sheet at a temperature in a range from about 800° C. to about 900° C., which can correspond to a target location with a minimum distance from the forming vessel in a range from about 130 mm to about 650 mm. The second horizontal line 907 represents the maximum heat flux obtainable using radiative cooling and/or convection currents of gas along the surface of the sheet at a temperature in a range from about 1000° C. to about 1100° C., which can correspond to a target location with a minimum distance from the forming vessel of about 100 mm or less. The data presented in FIG. 13 shows that overall heat flux increases as the mass flow rate increases until about 200 g/min beyond which the overall heat flux plateaus at about 60 kW/m$^2$. Without wishing to be bound by theory, heat flux increases as the temperature difference between a surface and a convective flow increases; however, boundary layers and/or transition regions can limit the ability of additional cooling to further increase heat flux. As such, it can be beneficial to use a mass flow rate less than 200 g/min where the overall heat flux plateaus. Limiting the coolant mass flow rate to 200 g/min can obtain the maximum overall heat flux while avoiding unnecessary forces against the ribbon of glass-forming material 103 that may result in damage to the ribbon without further increase in heat flux. An overall heat flux greater than the first horizontal line 905 is obtained for the lowest mass flow rate tested (e.g., about 30 g/min). An overall heat flux greater than the second horizontal line 907 can be obtained for a mass flow rate of about 90 g/min or more.

Figure 14:
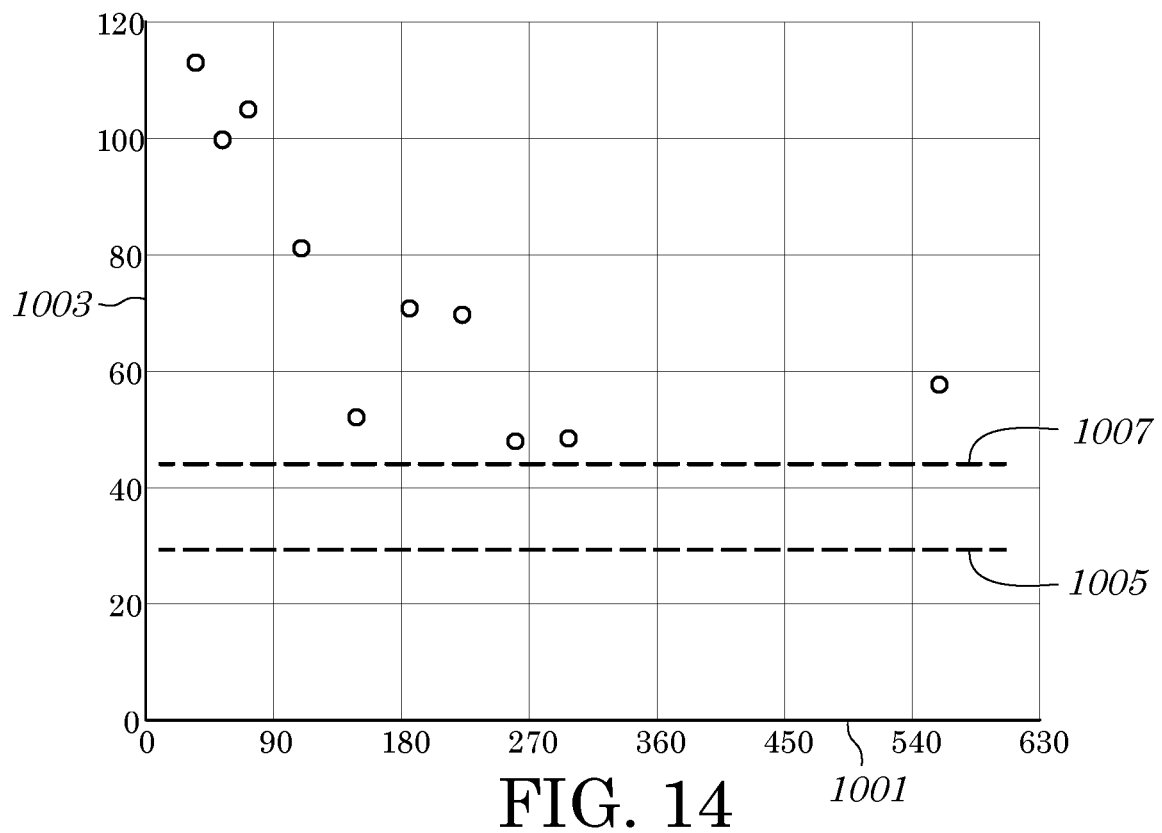
FIG. 14 is a plot illustrating localization of heat flux as a function of mass flow rate.

As used with regards to FIG. 14, localization of heat flux is the variation in temperature across the surface of the sheet multiplied by the thermal conductivity of the sheet. The horizontal axis 1001 (e.g., x-axis) is a mass flow rate of carbon dioxide in grams per minute (g/min). The vertical axis 1003 (e.g., y-axis) is a measured of the localization of heat flux in kilowatts per meter$^2$ (kW/m$^2$). The first horizontal line 1005 represents the maximum heat flux obtainable using radiative cooling and/or convection currents of gas along the surface of the sheet at a temperature in a range from about 800° C. to about 900° C., which can correspond to a target location with a minimum distance from the forming vessel in a range from about 130 mm to about 650 mm. The second horizontal line 1007 represent the maximum heat flux obtainable using radiative cooling and/or convection currents of gas along the surface of the sheet at a temperature in a range from about 1000° C. to about 1100° C., which can correspond to a target location with a minimum distance from the forming vessel of about 100 mm or less. All data plotted in FIG. 14 comprise localization of heat flux values greater than that of the first horizontal line 1005 and the second horizontal line 1007. However, the localization of heat flux decreases as the mass flow rate increases. FIG. 14 demonstrates that, in embodiments where the coolant is used for localized thickness control, a smaller coolant mass flow rate can provide more localized temperature control and thus morel localized thickness control.

The surface roughness for different glass manufacturing apparatuses is reported in Table 1. As used herein, "surface roughness" means the Ra surface roughness, which is an arithmetical mean of the absolute deviations of a surface profile from an average position in a direction normal to the surface of the test area. Unless otherwise indicated, all surface roughness values are the measured average roughness (Ra) for an 80 μm by 80 μm test area using atomic force microscopy (AFM). Example A is a ribbon of molten material that was not exposed to a coolant in accordance with the embodiments of the disclosure. Example B is a ribbon of molten material that was exposed to a carbon dioxide coolant flowed from a heated nozzle at the end of a conduit at about 80 g/min, which produced an overall heat flux of about 30 kW/m². Example C is a ribbon of molten material that was exposed to carbon dioxide coolant flowed from a heated nozzle at the end of a conduit at a coolant mass flow rate of about 120 g/min, which produced an overall heat flux of about 43 kW/m². Example D is a ribbon of molten material that was exposed to carbon dioxide coolant as in Example C except that the nozzle was not heated. Table 1 shows that Example A and Example B have the same surface roughness. As such, the carbon dioxide coolant did not damage the surface of the ribbon of molten material. When the coolant mass flow rate was increased, Example C comprises a slightly greater surface roughness. However, when the nozzle was not heated, the surface roughness doubled. In Example D, larger agglomerations of carbon dioxide particles were observed. As such, heating the nozzle inhibits (e.g., reduces, eliminates, prevents) agglomeration of coolant particles, which may otherwise increase the surface roughness of the ribbon of molten material if the nozzle was not heated.

TABLE 1

Surface Roughness

| Example | Surface Roughness (Ra) (nm) |
|---|---|
| A | 0.2 |
| B | 0.2 |
| C | 0.3 |
| D | 0.6 |

Methods of manufacturing glass in accordance with embodiments of the disclosure can decrease (e.g., reduce, prevent, eliminate) problems associated with baggy warp. Embodiments of the disclosure can avoid baggy warp by aggressively cooling an outer portion of the streams of molten material (e.g., first stream, second stream) opposite the inner portion of the respective stream of molten material to increase an effective viscosity where the ribbon of molten material is drawn. Methods of the embodiments of the disclosure can address the baggy warp problem by allowing greater cooling rates (e.g., heat flux) and/or cooling capacity than would be possible using heat transfer by convection and/or radiation. Providing a coolant that undergoes a phase change can absorb a large quantity of heat as it undergoes the phase change (e.g., latent heat, enthalpy of vaporization, enthalpy of sublimation). Additionally, providing a coolant that undergoes a phase change can absorb heat when it is heated to a temperature where it undergoes the phase change as well as when it is heated as a gas afterwards. This increased cooling capacity can enable processing of molten material comprising a lower liquidus viscosity to a predetermined thickness (e.g., from 300 micrometers to about 5 millimeters) than would otherwise be possible. In addition, providing a coolant that undergoes a phase change to a gas can avoid surface damage to the flowing ribbon of molten material that may otherwise occur if a solid or liquid were permitted to impact the flowing ribbon.

The positioning of the target location can provide further technical benefits. For example, directing the coolant toward a target location positioned below the forming vessel can decrease (e.g., reduce, eliminate, prevent) the incidence of devitrification (e.g., crystallization) of the molten material on the forming vessel. As well, directing the coolant toward a target location above the pull rollers can provide increased processing efficiency (e.g., reduced time, reduced space). For example, increased cooling capacity (e.g., above the pull rollers, below the forming device) can enable a reduction in the time between when the ribbon of molten material is drawn from the forming vessel and when it can undergo subsequent processing. Additionally, increased cooling capacity (e.g., above the pull rollers, below the forming device) can enable a reduction in a length of molten material travel path from when the ribbon of molten material is drawn from the forming vessel and when it can be handled (e.g., by pull rollers, for subsequent processing).

Additional features of embodiments of the disclosure can provide further technical benefits. For example, providing a mass flow rate of the coolant in a range from about 1 gram per minute to about 200 grams per minute can enable increased cooling rates and/or cooling capacity without damaging the surface(s) of the ribbon of molten material being cooled. Also, providing a coolant comprising a small median particle size (e.g., 5 micrometers to about 20 micrometers) can decrease (e.g., reduce, prevent, eliminate) the incidence of surface damage because it decreases the likelihood that a particle will impact a surface of the ribbon of molten material instead of and/or before undergoing a phase transition (e.g., to a gas) while still increasing the cooling rate and/or cooling capacity. Likewise, providing a coolant comprising a controlled, narrow particle size distribution (e.g., about 90% of the particles comprise a size in a range from about 1 micrometer to about 100 micrometers) can decrease (e.g., reduce, eliminate) the likelihood that a particle will impact a surface of the ribbon of molten material instead of and/or before undergoing a phase transition (e.g., to a gas) while still increasing the cooling rate and/or cooling capacity. Either of the above particle size relationships can be enabled by heating the conduit (e.g., outlet of the conduit, nozzle) because such heating can inhibit (e.g., reduce, prevent, eliminate) agglomeration of particles. Additionally, positioning the nozzle near the ribbon of molten material (e.g., within a range from about 100 millimeters to about 1 meter) can decrease (e.g., reduce) the velocity of the coolant exiting the conduit, which can decrease (e.g., reduce, eliminate) the incidence of surface defects. Providing a convective air current traveling along the ribbon of molten material can decrease (e.g., reduce, eliminate) the likelihood that a particle will impact a surface of the ribbon of molten material instead of and/or before undergoing a phase transition (e.g., to a gas) because the convective air current can redirect (e.g., carry away) such particles. Also, such a convective air current can direct (e.g., remove) the coolant after it undergoes a phase transition (e.g., to a gas) and thereby create room for additional coolant to undergo a phase change to provide continued cooling of the ribbon.

As used herein, the terms "the," "a," or "an," mean "at least one," and should not be limited to "only one" unless explicitly indicated to the contrary. Thus, for example, reference to "a component" comprises embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to comprise the specific value or endpoint referred to. If a numerical value or endpoint of a range in the specification recites "about," the numerical value or endpoint of a range is intended to comprise two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

As used herein, the terms "comprising" and "including," and variations thereof, shall be construed as synonymous and open ended, unless otherwise indicated. A list of elements following the transitional phrases comprising or including is a non-exclusive list, such that elements in addition to those specifically recited in the list may also be present.

It should be understood that while various embodiments have been described in detail relative to certain illustrative and specific examples thereof, the present disclosure should not be considered limited to such, as numerous modifications and combinations of the disclosed features are possible without departing from the scope of the following claims.

What is claimed is:

1. A glass manufacturing apparatus, comprising:
a forming apparatus defining a travel path extending in a travel direction, the forming apparatus configured to convey a ribbon of glass-forming material along the travel path in the travel direction;
a cooling tube extending substantially parallel to the travel path and extending across the travel direction, the cooling tube comprising a plurality of orifices spaced apparat along the cooling tube and facing the travel path; and
a plurality of nozzles, a nozzle of the plurality of nozzles in fluid communication with a corresponding orifice of the plurality of orifices, the nozzle comprising a mixing chamber configured to receive compressed gas and a cooling fluid, and the nozzle further configured to discharge atomized streams of fluid toward the travel path;
wherein the plurality of orifices are sequentially spaced apart across the travel direction, and wherein the plurality of nozzles comprise:
an inner group of nozzles positioned toward a center of the cooling tube; and
a first outer group of nozzles and a second outer group of nozzles positioned toward ends of the cooling tube, and a diameter of nozzle orifices of the first outer group of nozzles and second outer group of nozzles is larger than a diameter of nozzle orifices of the inner group of nozzles.

2. The glass manufacturing apparatus of claim 1, wherein the cooling tube extends linearly along a cooling axis substantially perpendicular to the travel direction.

3. The glass manufacturing apparatus of claim 1, wherein the cooling tube comprises a first chamber configured to receive the compressed gas, and a second chamber configured to receive the cooling fluid, the plurality of orifices comprising a first orifice in fluid communication with the first chamber and the mixing chamber, and a second orifice in fluid communication with the second chamber and the mixing chamber, the mixing chamber configured to receive the compressed gas from the first chamber and the cooling fluid from the second chamber.

4. The glass manufacturing apparatus of claim 3, wherein a first nozzle orifice of a first nozzle of the plurality of nozzles comprises a first diameter and a second nozzle orifice of a second nozzle of the plurality of nozzles comprises a second diameter equal to the first diameter.

5. The glass manufacturing apparatus of claim 4, wherein the plurality of nozzles comprises a set of sequentially spaced nozzles comprising the first nozzle, the second nozzle spaced a first distance from the first nozzle, and a third nozzle of the plurality of nozzles spaced a second distance from the second nozzle, the second nozzle positioned in series between the first nozzle and the third nozzle, and the first distance is different than the second distance.

6. The glass manufacturing apparatus of claim 5, wherein a third nozzle orifice of the third nozzle comprises a third diameter different than the second diameter.

7. The glass manufacturing apparatus of claim 1, wherein the cooling tube comprises a plurality of cooling tubes comprising a first set of cooling tubes and a second set of cooling tubes, the first set of cooling tubes positioned on a first side of the travel path, and the second set of cooling tubes positioned on a second side of the travel path, and wherein the cooling fluid comprises a liquid.

8. The glass manufacturing apparatus of claim 7, wherein cooling tubes of the first set of cooling tubes are sequentially spaced apart along the travel direction and cooling tubes of the second set of cooling tubes are sequentially spaced apart along the travel direction.

* * * * *